(12) United States Patent
Suzuki

(10) Patent No.: US 7,561,293 B2
(45) Date of Patent: Jul. 14, 2009

(54) IMAGE-FORMING DEVICE, IMAGE-FORMING METHOD, COMPUTER PROGRAM, AND COMPUTER-READABLE RECORDING MEDIUM

(75) Inventor: Akira Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 11/139,298

(22) Filed: May 27, 2005

(65) Prior Publication Data
US 2005/0264848 A1 Dec. 1, 2005

(30) Foreign Application Priority Data
Jun. 1, 2004 (JP) ............................. 2004-163561
May 13, 2005 (JP) ............................. 2005-141183

(51) Int. Cl.
*G06F 15/00* (2006.01)
*G06F 15/16* (2006.01)

(52) U.S. Cl. ...................................... 358/1.15; 709/206
(58) Field of Classification Search ................ 358/1.15, 358/1.13, 1.18, 1.6, 452, 1.1; 715/236, 234, 715/239, 246, 764, 251, 243; 709/206; 400/61, 400/76
See application file for complete search history.

(56) References Cited

U.S. PATENT DOCUMENTS

2003/0231916 A1* 12/2003 Tagawa ....................... 400/76

* cited by examiner

*Primary Examiner*—Saeid Ebrahimi Dehkordy
(74) *Attorney, Agent, or Firm*—Canon U.S.A. Inc., I.P. Division

(57) ABSTRACT

To select an element block from an element tree obtained by analyzing a structured document and arrange the element block into a page in a simple and appropriate manner. First, a pointer for referring to a next previous element block is provided. Secondly, page-break processing corresponding to the type of contents of the element block is performed.

11 Claims, 25 Drawing Sheets

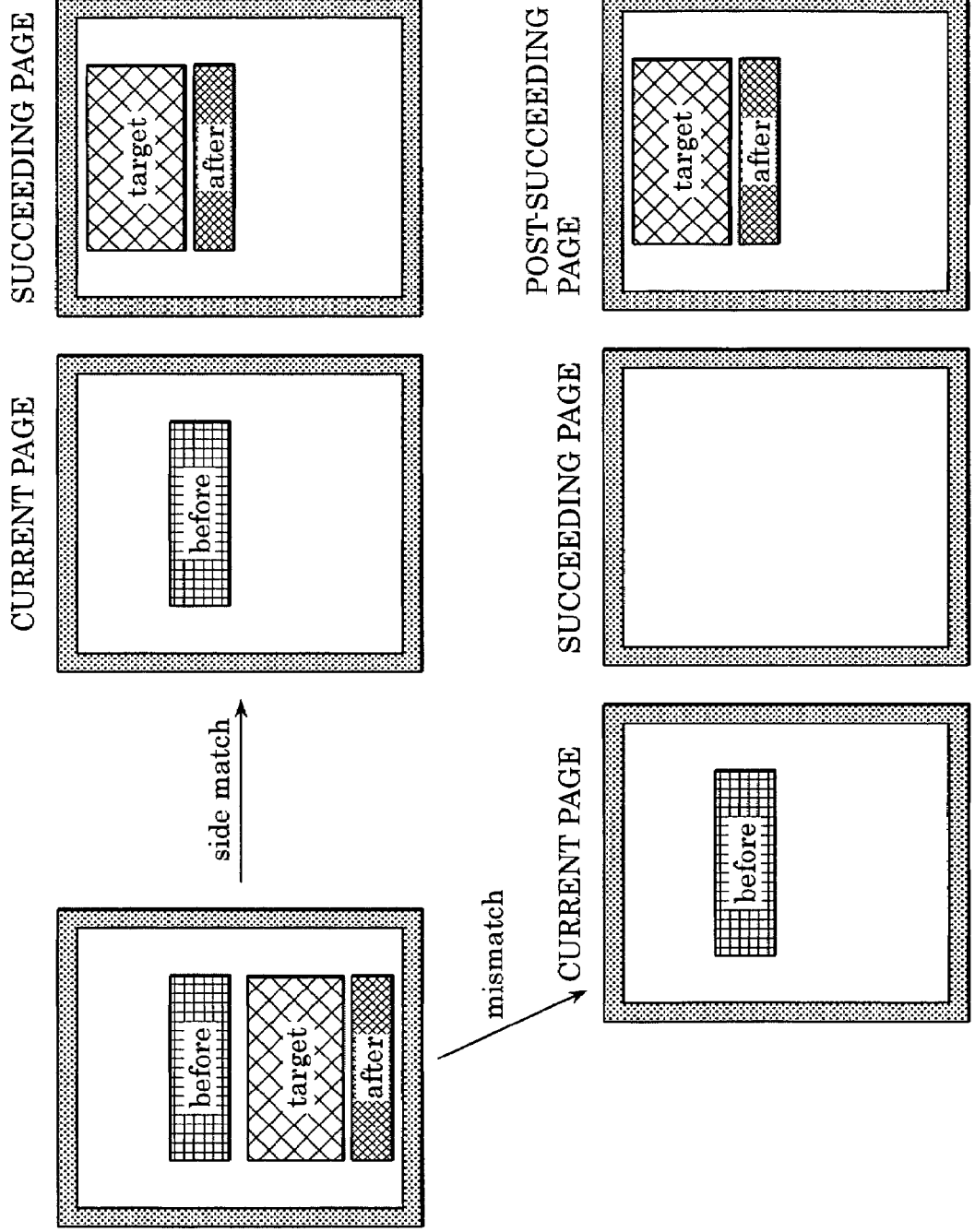

FIG. 8
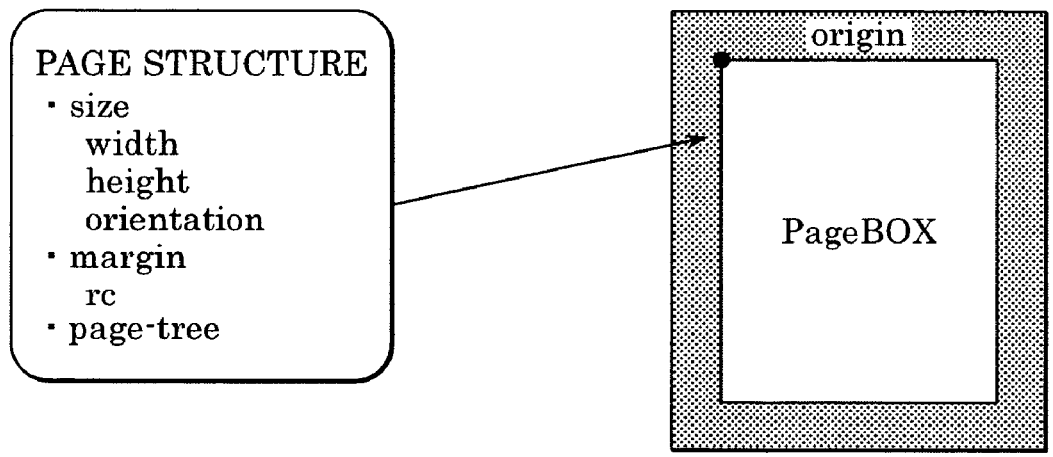
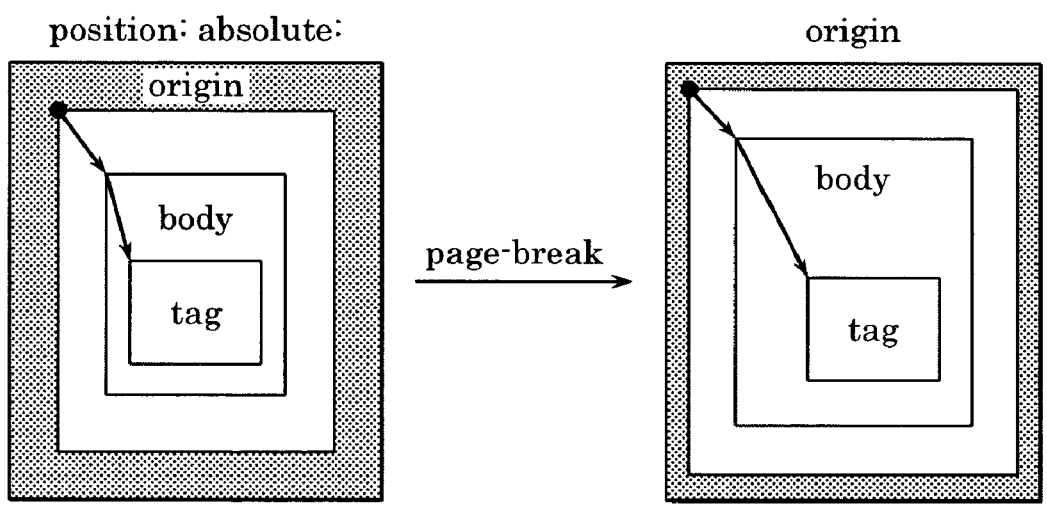
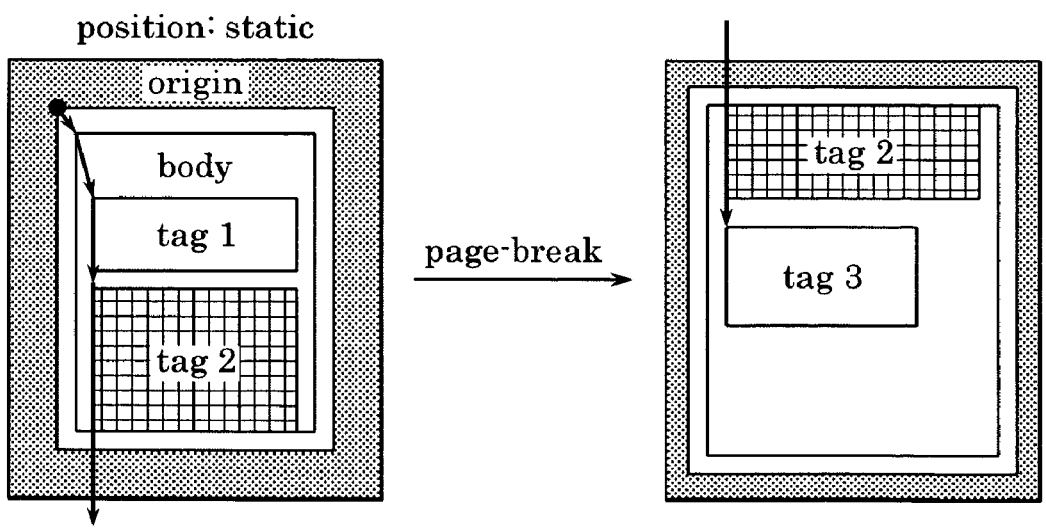

PAGE TREE

FIG. 11
OUTPUT IMAGE
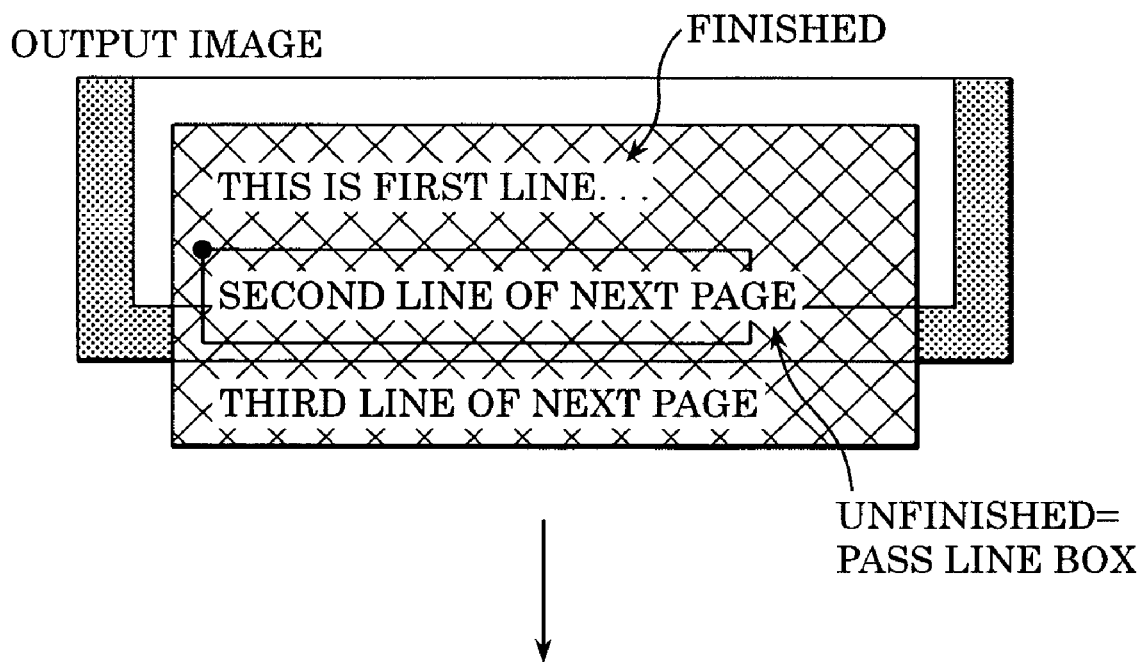
PAGE-BREAK RESULT
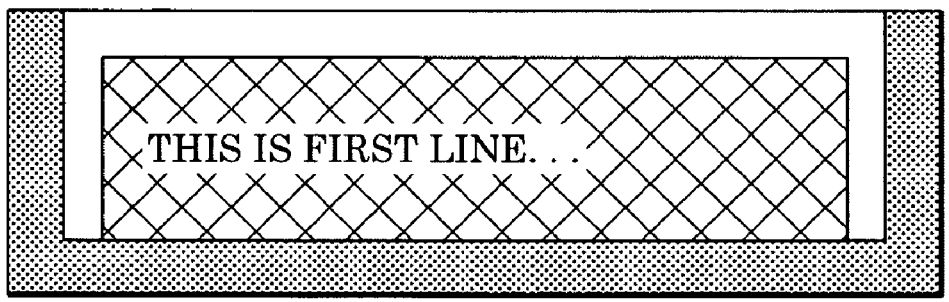
STARTING POSITION=HEAD OF PAGE BOX
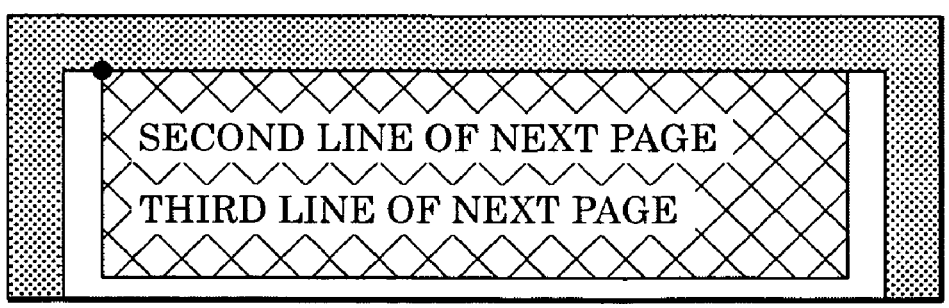

FIG. 12
OUTPUT IMAGE
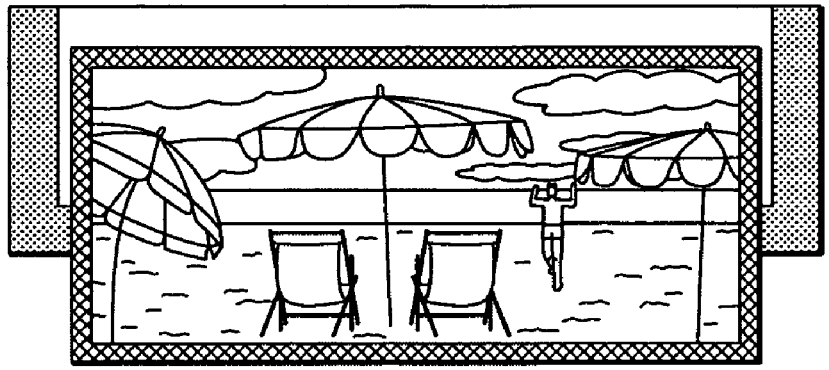
↓ PASS ENTIRE IMAGE
PAGE-BREAK RESULT
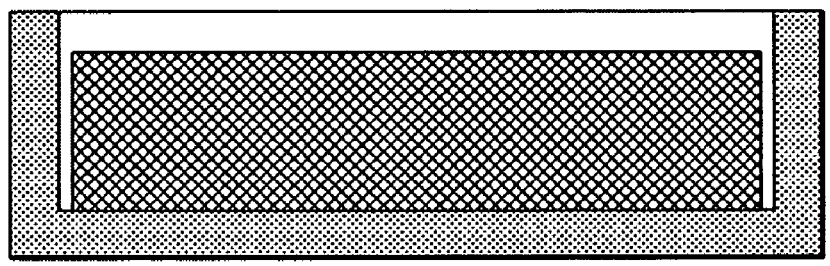
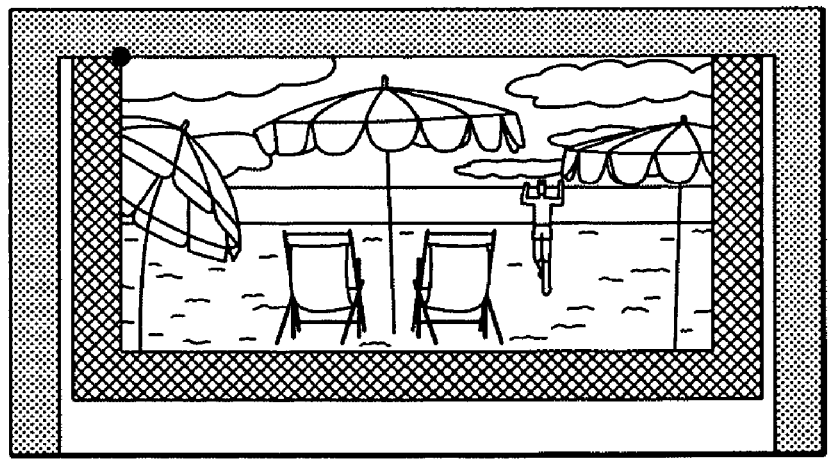

FIG. 13
OUTPUT IMAGE
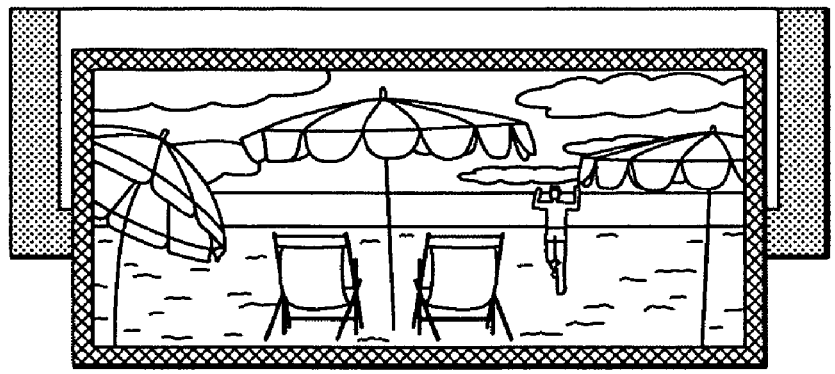
↓ PASS ENTIRE IMAGE AND BACKGROUND
PAGE-BREAK RESULT
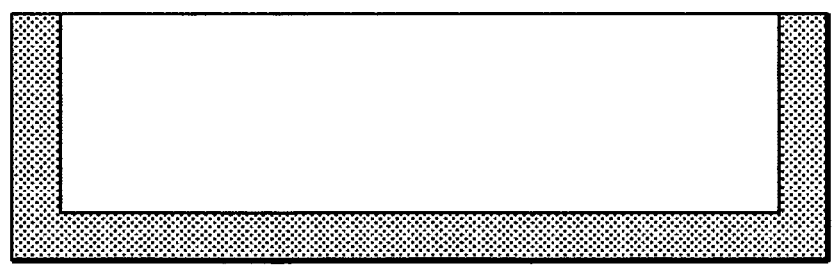
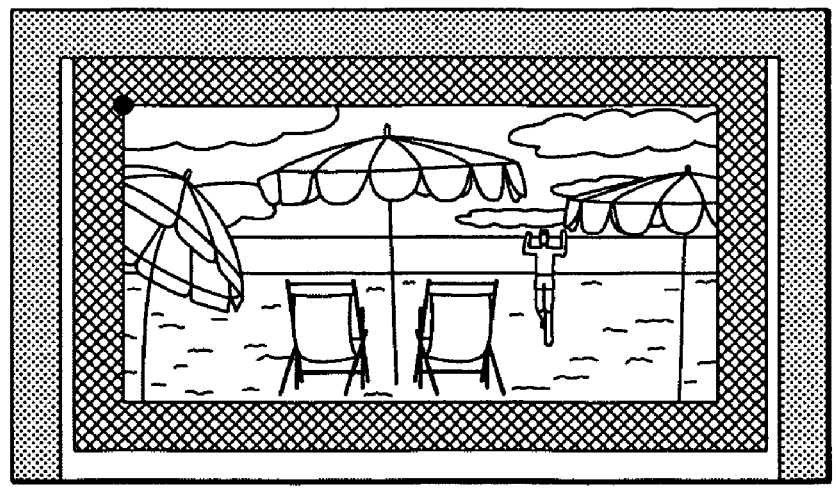

ARRANGEMENT BY IMAGE CLIPPING
(page-brake-inside-clip)

IMAGE-FORMING DEVICE, IMAGE-FORMING METHOD, COMPUTER PROGRAM, AND COMPUTER-READABLE RECORDING MEDIUM

BACKGROUND OF THE INVENTION

1. Field of the Invention

The present invention relates to an image-forming device and particularly relates to a technology suitable for printing contents distributed via data communications including digital-data broadcast, the Internet, and so forth.

2. Description of the Related Art

Hitherto, there have been proposed printers that can reduce the size of an output image of the contents of an HTML file, change or rotate the orientation of the output image, and ignore a line-feed prohibition instruction and/or lateral-width specification, where the lateral width of the output image is larger than the size of a recording medium.

In the case of the above-described printer, where page-break part of the output image includes characters written into the HTML file, a line including the above-described characters is inserted into image information that is generated, as the layout of a succeeding page.

In an element tree obtained by analyzing the HTML file, interference often arises between an element block that had already been arranged and an element block that is to be printed, relating to the arrangement of the element block that is to be printed. For example, in the case where page-break processing is performed, it becomes necessary to recursively refer to the element block that had already been arranged for rearranging previous elements.

In the past, it was necessary to follow the element tree every time the necessity for referring to the arranged block arises. That is to say, it was necessary to trace the element tree back to the upper part thereof, trace the element tree down to the lower part thereof, and trace links, so as to obtain the pointer of a desired element block.

In recent years, digital TVs and mobile gear including a mobile phone, a digital camera, and so forth have increasingly used contents written in markup languages. However, since the above-described equipment and devices have limited resources, it has been desired that processing load on the equipment and devices be reduced as much as possible. For example, layout processing for converting the contents into print data is heavy-load processing, since the layout processing requires very large memory resources for holding element blocks.

Further, in the case where a display image of the contents of an HTML document is produced on a display unit or the like and where the contents extend beyond a displayable area, a scroll bar is provided, so as to allow an operator to move the contents in the displayable area. As for printing, a page-assignment method has been demanded for the contents of the HTML document, so as to give a visual feeling of neither physical disorder nor disturbance to an observer. The physical disorder and the disturbance often arise due to the limited size of a recording medium.

SUMMARY OF THE INVENTION

The present invention allows decreasing a processing load on the printer side for generating print data from the contents of an HTML document whose layout is written in a language that is not strictly stipulated and processing the print data effectively.

The present invention provides an image-forming device for selecting at least one element block from an element tree obtained by analyzing a structured document and arranging the selected element block into a predetermined page. The image-forming device includes an arrangement unit configured to arrange a first element block into the page, an update unit configured to update a first reference pointer that refers to the first element block, as a next-previous element block, after the first element block is arranged by the arrangement unit and a second reference pointer that refers to a second element block that is arranged after the first element block is arranged, as a current element block, a style-reference unit that refers to style specification corresponding to the second element block, and a determination unit for determining which of the first updated reference pointer and the second updated reference pointer is suitable for use based on the style specification referred by the style-reference unit. The arrangement unit arranges the first element block by referring to either the first reference pointer or the second reference pointer determined by the determination unit.

The present invention provides a processing method for an image-forming device for selecting at least one element block from an element tree obtained by analyzing a structured document and arranging the selected element block into a predetermined page. The processing method includes the steps of arranging a first element block into the page, updating a first reference pointer that refers to the first element block, as a next-previous element block, after the first element block is arranged through the arrangement step and a second reference pointer that refers to a second element block that is arranged after the first element block is arranged, as a current element block, referring to style specification corresponding to the second element block, and determining which of the first updated reference pointer and the second updated reference pointer is suitable for use based on the style specification referred at the style-reference step. At the arrangement step, the first element block is arranged by referring to either the first reference pointer or the second reference pointer that is determined at the determination step.

The present invention provides an image-forming device for selecting at least one element block from an element tree obtained by analyzing a structured document and arranging the selected element block into a predetermined page. The image-forming device includes a size-determination unit configured to determine whether at least one element block for arrangement falls within the predetermined page. The image-forming device further includes a page-break-processing unit configured to perform page-break processing corresponding to the type of data of the element block for arrangement, where the size-determination unit determines that the element block for arrangement does not fall within the predetermined page.

The present invention provides a processing method for an image-forming device for selecting at least one element block from an element tree obtained by analyzing a structured document and arranging the selected element block into a predetermined page. The processing method includes steps of determining whether at least one element block for arrangement falls within the predetermined page and performing page-break processing corresponding to the type of data of the element block for arrangement, where it is determined that the element block for arrangement does not fall within the predetermined page.

Further features and advantages of the present invention will become apparent from the following description of exemplary embodiments (with reference to the attached drawings).

BRIEF DESCRIPTION OF THE DRAWINGS

FIG. 7B shows either "page-break-before: left;" specification, or "page-break-before: right;" specification.

FIG. 8 shows the position of an origin point during page-break processing.

FIG. 11 shows page-break processing performed for an element block including text data.

FIG. 12 shows page-break processing performed for an element block including image data according to a known method.

FIG. 13 shows page-break processing performed for an element block including image data according to the embodiment of the present invention.

DESCRIPTION OF THE EMBODIMENTS

An embodiment of the present invention is described below.

A printer according to the embodiment will be described with reference to the attached drawings.

This embodiment will be described based on the extensible Hyper Text Markup Language (XHTML) 1.1™ decided by the World Wide Web Consortium (W3C) and a specification decided by the Cascading Style Sheet 2.0 (CSS2.0™).

Further, a "node-link structure" that will be described in this embodiment denotes a structure including a plurality of items, where each of the items can be divided into a node and a link, and each of the links is related to at least two nodes. The relationship between the node and the link is that between elements on the basis of the node path and the link between the elements.

[The Configuration of System]

Figure 1:
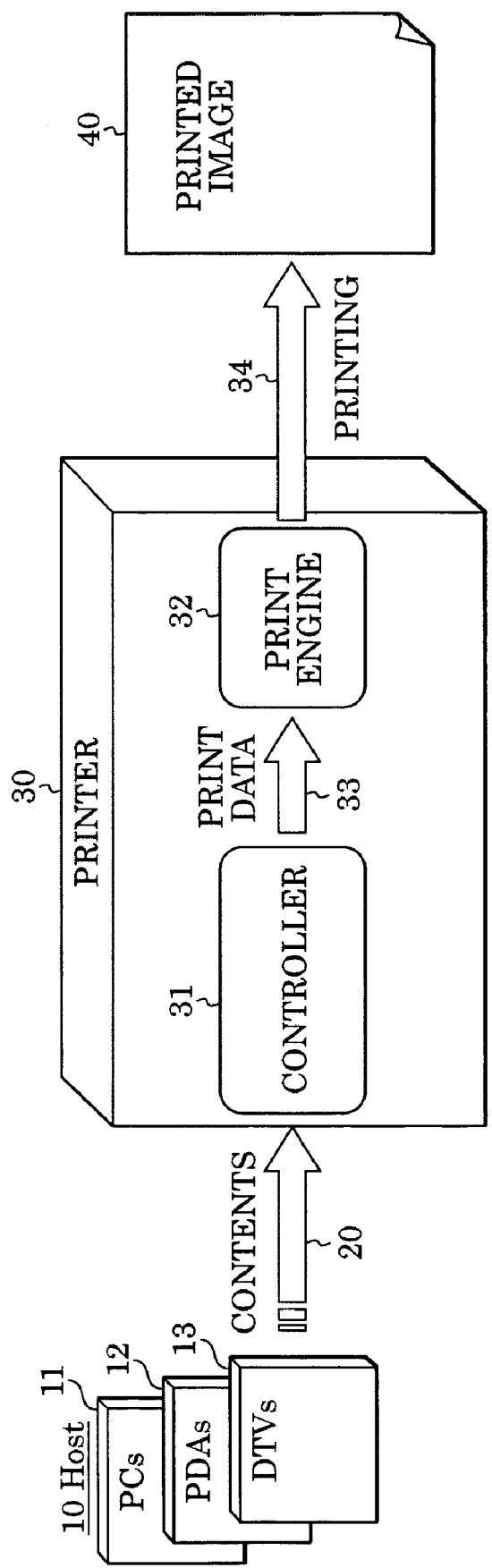
FIG. 1 shows the configuration of a printing system according an embodiment of the present invention.

FIG. 1 shows the configuration of a printing system according to the embodiment.

As shown in FIG. 1, a printer 30 functioning as an image-forming device according to the embodiment includes a controller 31 and a print engine 32. The controller 31 translates contents 20 including a structured document such as an HTML document transmitted from a host computer 10 that is connected to the controller 31 via wired connection and/or wireless connection and converts the contents into print data 33. Here, the host computer 10 includes a personal computer (PC) 11, a personal digital assistant (PDA) 12, a digital-broadcast device 13, and so forth. The above-described term "PDA" is used herein, as the generic name of personal portable information devices. The print engine 32 performs print processing 34 for printing the print data 33 on a recording medium 40 including paper or the like. The controller 31 is formed, as a single-board computer including a CPU, a storage unit, and an interface.

[Construction of Element Tree]

Figure 2:
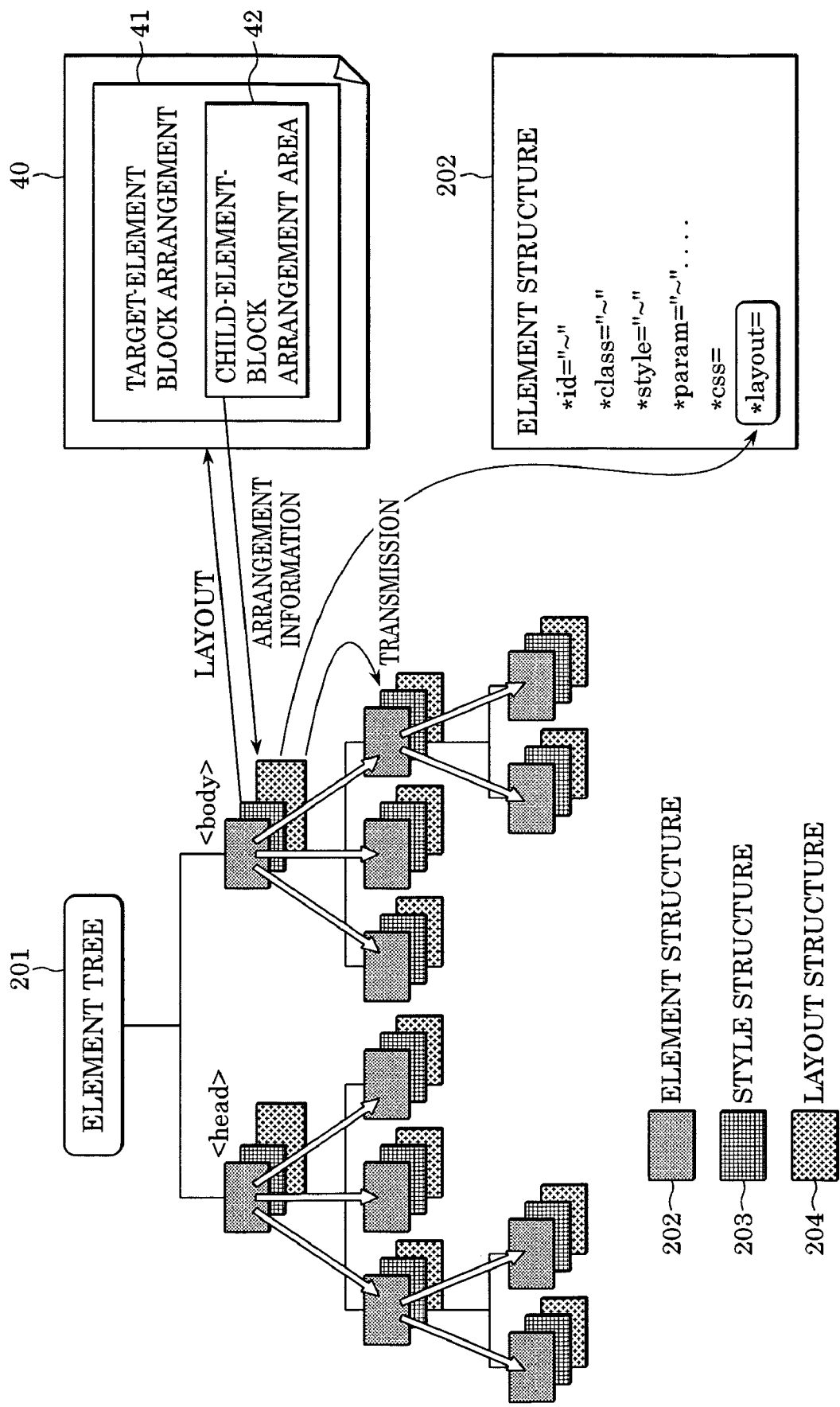
FIG. 2 shows an element tree and structures.

FIG. 2 shows an entire element tree (a multi-directional branch list) 201 including entire element blocks obtained through lexical analysis and syntax analysis performed by the controller 31. The entire element tree 201 is provided, as the plot of the nodes and links. Each of the nodes of the entire element tree 201 includes three data structures, as an element block. The three data structures include, an "element structure 202" functioning as the substance data (content data) of the element block, a "style structure 203" including information about style which is obtained by analyzing characters in style description language in the element block in reference to a style sheet, and a "layout structure 204" including layout information about a position of an object to be allocated and background of an object like color information. The layout information stored in "layout structure 204" is obtained by calculating a position of an object corresponding to the element block to be allocated.

[Layout Procedures]

Procedures for arranging the element block on the recording medium 40 effectively are described below. Here, the recording medium 40 functions as an output medium.

First, the controller 31 follows a route of the element tree, that is, descriptions of <html> written in the structured document, in sequence and performs page-layout processing 41, that is, arrangement processing for target element blocks, for a BOX model, a character, an image, and so forth based on a style structure 203 included in each of the element blocks.

Information about the element-block layout result is stored in a layout structure 204 for holding layout-and-visual information. At that time, information about a possible arrangement area 42, that is, a child-element block in the target element block is also stored in the layout structure 204. The layout structure 204 storing the layout-and-visual information is transmitted to the child element block. That is to say, the controller 31 arranges the child-element block into the possible arrangement area 42 specified by a parent-element block. From that time forward, the element-block arrangement result is stored in the layout structure 204 and transmitted to a grandchild-element block in a like manner. Thus, the processing transition proceeds.

[Management of Page Information]

Figure 3:
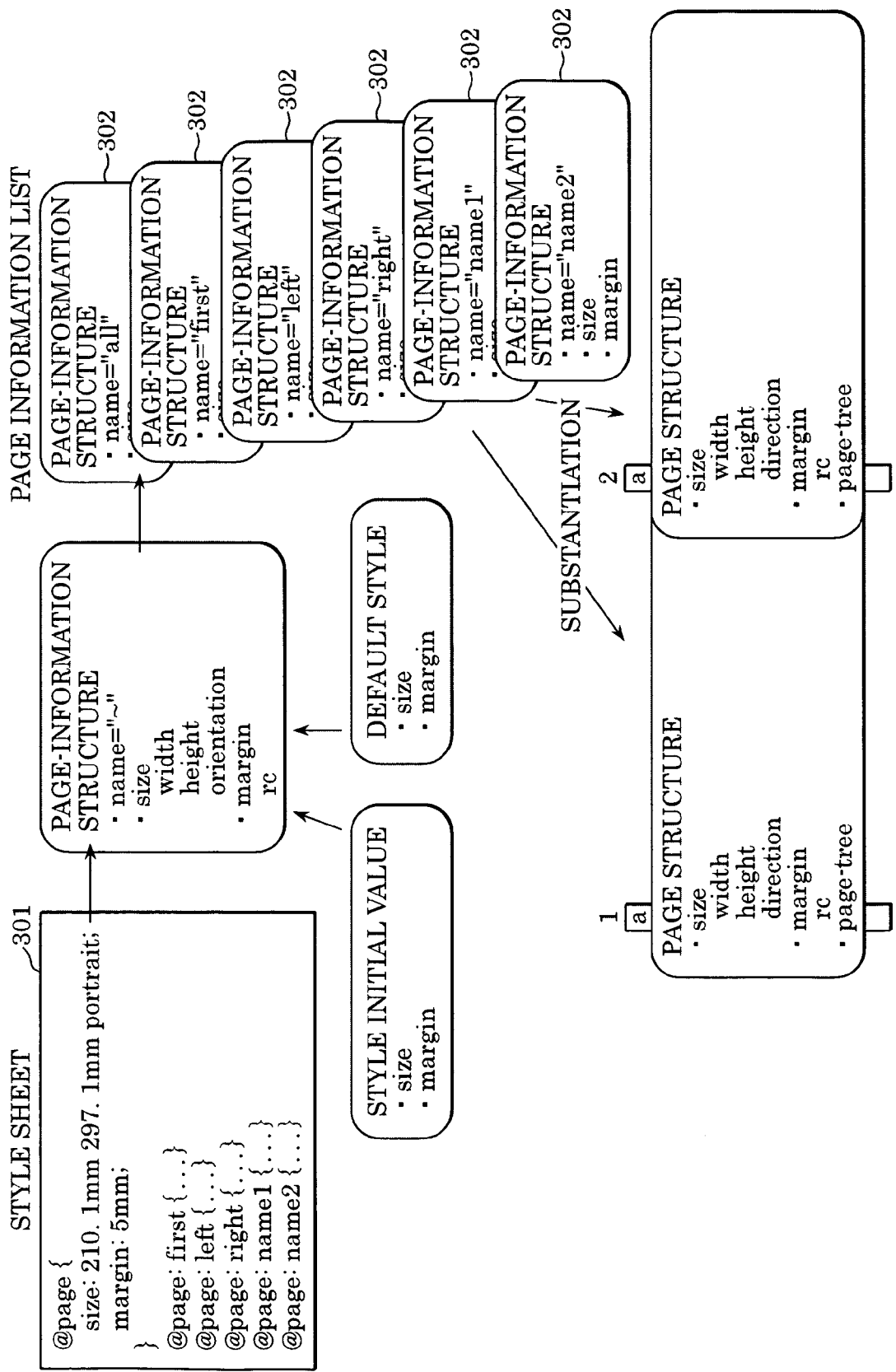
FIG. 3 shows the construction of a page-information list.

FIG. 3 illustrates the construction of a page-information list.

First, a list of a plurality of page-information structures 302 is generated based on page information that is listed in a style sheet 301 and that is represented by rule "@page" for specifying processing relating to page break. The page-information structure 302 shows the settings of a page at the time where contents are printed and output.

More specifically, the page-information structure is written according to the format of @page: xxxx{}. The specifier "xxxx" corresponds to any one of an identifier "first" indicating the first page, an identifier "left" indicating the left side of a double-page spread, an identifier "right" indicating the right side of the double-page spread, identifiers "name1" and "name2", where both the identifiers indicates a named page, and so forth. Further, the specifier { } includes the size, orientation, and margin of a form used for a page specified by the part indicated by the specifier "xxxx". In the case of the specifier "@page{ }", that is to say, where no identifier is shown at the position corresponding to the specifier "xxxx", the page-information structure is formed, as an information structure that is common to entire pages.

For generating the page-information structure, the controller 31 expands a page style specified by a style-initial-value sheet and a default-style sheet of @media print into the page-information structure 302. In this drawing, a page-information list of the page-information structures 302 is stored in a RAM. The page-information structures 302 include information corresponding to the specifier "all" (1), the specifier "first" (2), the specifier "left" (3), the specifier right "4", the specifier "name" (5, 6 . . . ), respectively.

Further, the page-information structure 302 corresponding to the information shown as name="all" has no identifier specification decided by the rule @page and has settings that are common to entire pages. This page-information structure 302 is catalogued into the list, as the first data.

The page-information structure 302 corresponding to the information shown as name="first" shows settings on the first page decided by the rule @page: first and is catalogued into the list, as the second data. The page-information structure 302 corresponding to the information shown as name="left" shows settings on the left part of the double-page spread decided by the rule @page: left and is catalogued into the list, as the third data. The page-information structure 302 corresponding to the information shown as name="right" shows settings on the right part of the double-page spread decided by the rule @page: right and is catalogued into the list, as the fourth data. From then on, the page-information structures 302 whose settings decided by the rule @page: xxxx correspond to the named page are catalogued into the list, respectively, as the fifth data and later data.

Where the controller 31 performs the page-layout processing, it refers to the page-information structure 302 corresponding to a page that is currently subjected to the page-layout processing, and generates the substance of the page structure. For example, in the case of the first page, the controller 31 refers to the page-information structure 302 corresponding to the information "first" and the page-information structure 302 corresponding to the information "left" in that order. As for the second page including the named page "name 1", the controller 31 refers to the page-information structure 302 corresponding to the information "right" and the information structure 302 corresponding to the information "name 1" in that order, and substantiates the page structure. The substantiated page structure includes a page-tree that has elements arranged in the pages, that is, element blocks, as a multi-directional branch list.

[Arrangement of Elements into Page]

Figure 4:
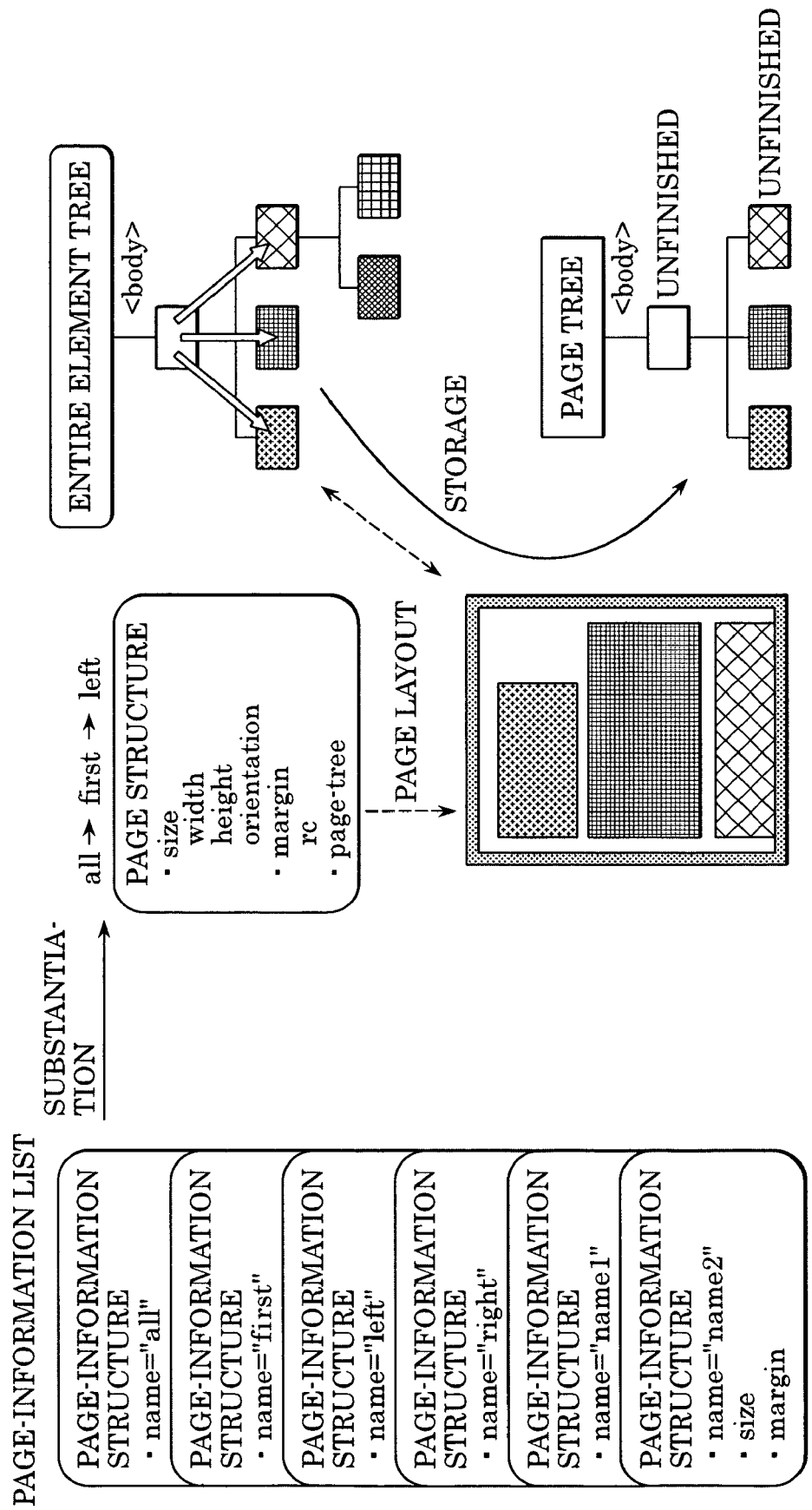
FIG. 4 shows how to handle a page structure for performing page-layout processing and illustrates a first page.
Figure 5:
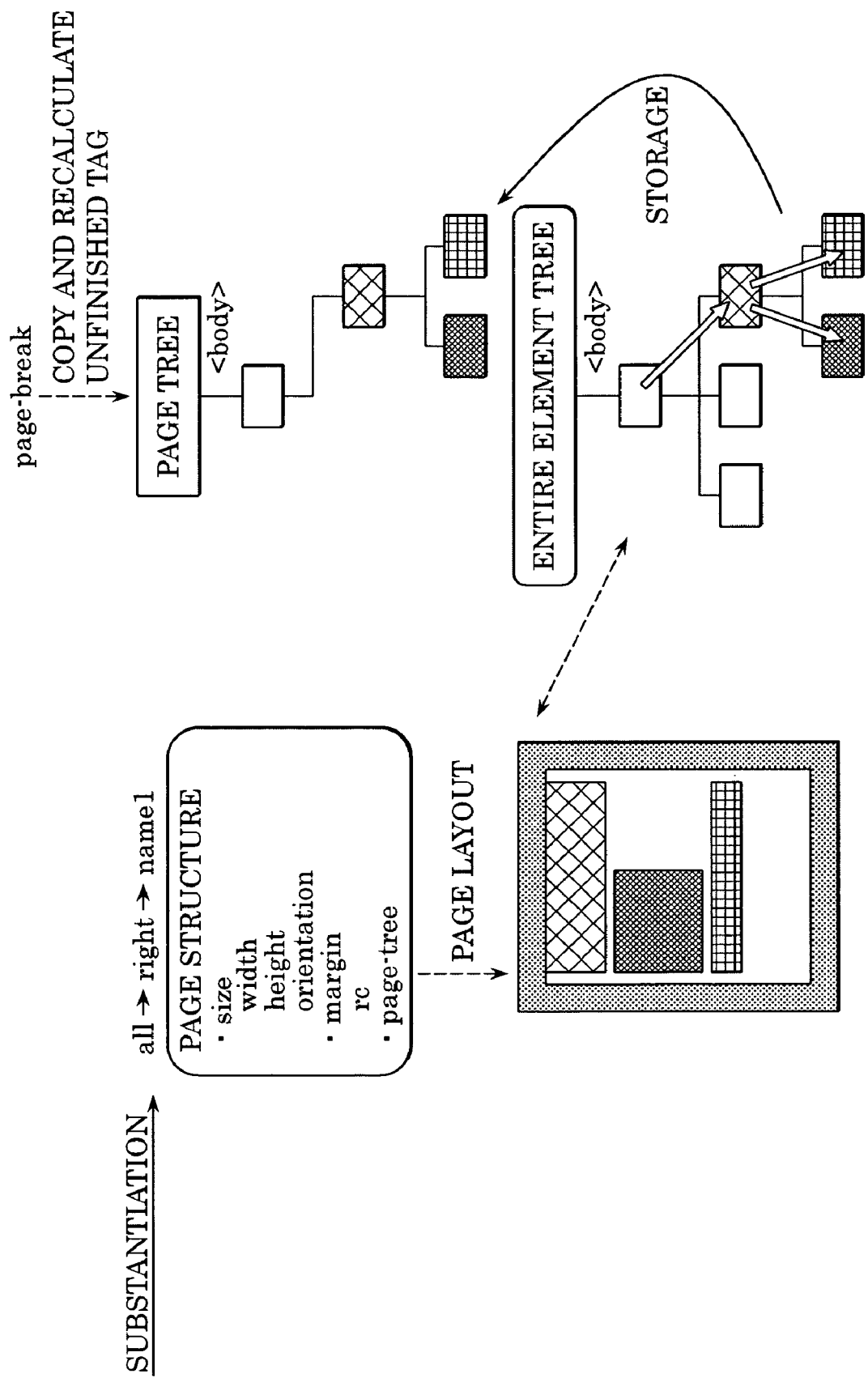
FIG. 5 shows how to handle the page structure for performing the page-layout processing and illustrates a second page.

FIGS. 4 and 5 illustrate processing performed by using the page structure for performing page-layout processing. FIG. 4 shows processing performed for the first page. FIG. 5 shows processing performed for the second page.

As described above, the controller 31 selects the page-information structure 302 corresponding to a page that is currently subjected to the page-layout processing, as page information, and generates the substance of the page structure for the current page with reference to the selected page-information structure 302.

The substance of the page structure is the page-tree for managing elements including size (width, height, portrait/landscape), margin, and rectangle information that are written by the rule @page, as the multi-directional list.

A method for cataloging the element block into the page-tree is described below.

First, the controller 31 generates the substance of the page structure corresponding to the first page. Then, for performing the page-layout processing, the controller 31 follows the route or the descriptions of <html> of the element tree in sequence and arranges tags after the specifier <body> into the page in sequence, based on information including the element structure 202, the style structure 203, and the layout structure 204. Fixed-layout information is stored in the layout structure 204.

The element block arranged into the page is catalogued into the page-tree of the page structure. Where the arranged element block does not fall within the page, or where a page-break instruction is issued according to the page-break style, page-break processing is performed.

For performing the page-break processing, the controller 31 generates new substance of the page structure including the page-tree for a succeeding page. Then, the controller 31 performs calculation again for arranging the element block which did not fall within the next previous page into the area of a page structure of the succeeding page. More specifically, the controller 31 copies the element block that could not be arranged into the current page-tree to a page-tree of the succeeding page and moves the layout information forward by as much as the vertical length of a form subjected to the page-break processing.

That is, according to this embodiment, not only the substance of the element block, but also information about the style is moved. Where the page-layout processing is performed for the next and later pages, elements that were not output are copied and catalogued into the page-tree of the succeeding page and an element block that had not been arranged into the current page is arranged into the succeeding page.

The description of <body> in the HTML document including the entire element blocks does not appear until the time where the final page is output. When all of the child elements in the <body> are output, the final page is completed and the page-layout processing is finished.

[Style Specification]

Page-break processing performed according to style specification is described next with reference to FIGS. 6, 7A, 7B, 7C, 7D, 7E, and 7F.

Figure 6:
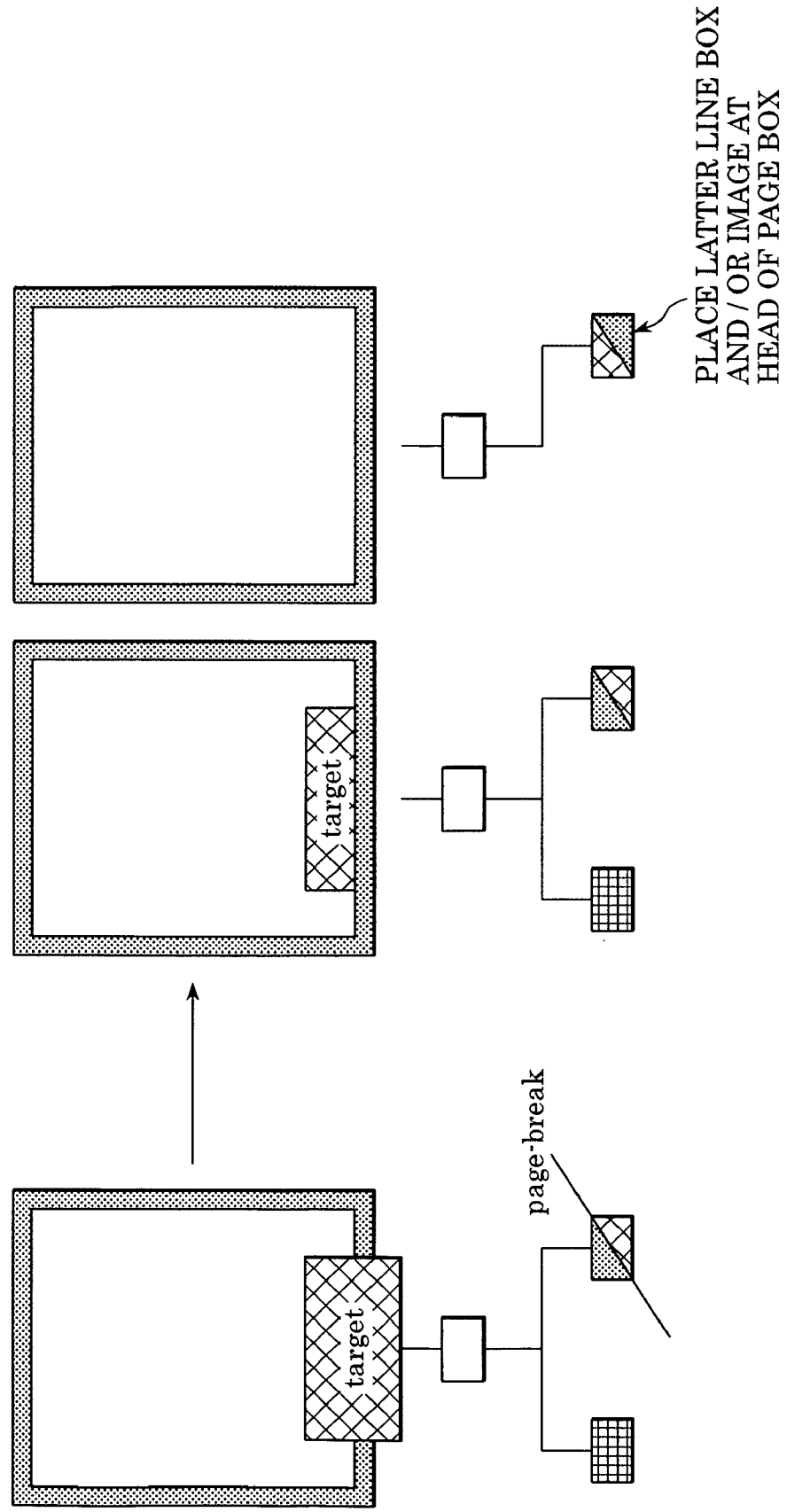
FIG. 6 illustrates known page-break processing.

FIG. 6 illustrates known page-break processing. This drawing illustrates the case where a target element block extends off a page due to page-break processing, where the target element block is arranged. Here, the element block is divided into two parts, so that the first half of the element block is arranged into the next previous page and the latter half of the element block is arranged into a later page subsequent to the next previous page.

Figure 7A:
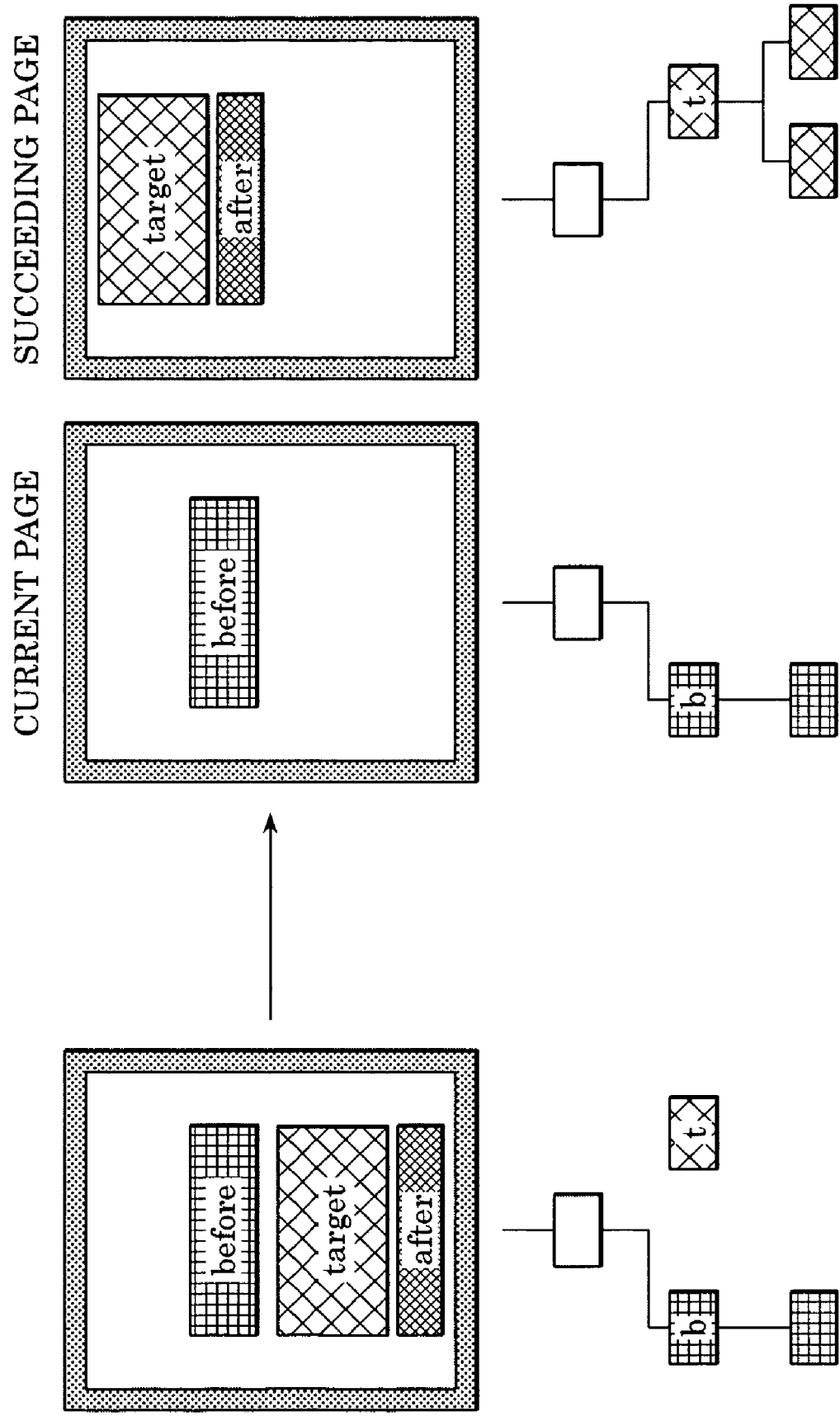
FIG. 7A shows "page-break-before: always;" specification.

FIG. 7A shows the page-break-before: always specification. This specification is made for performing forced page-break processing before performing layout processing for contents of a specified tag.

FIG. 7B shows the page-break-before: left specification, or the page-break-before: right specification that is made for performing forced page-break processing until the page corresponding to either the right side or the left side of a specified tag appears.

Figure 7C:
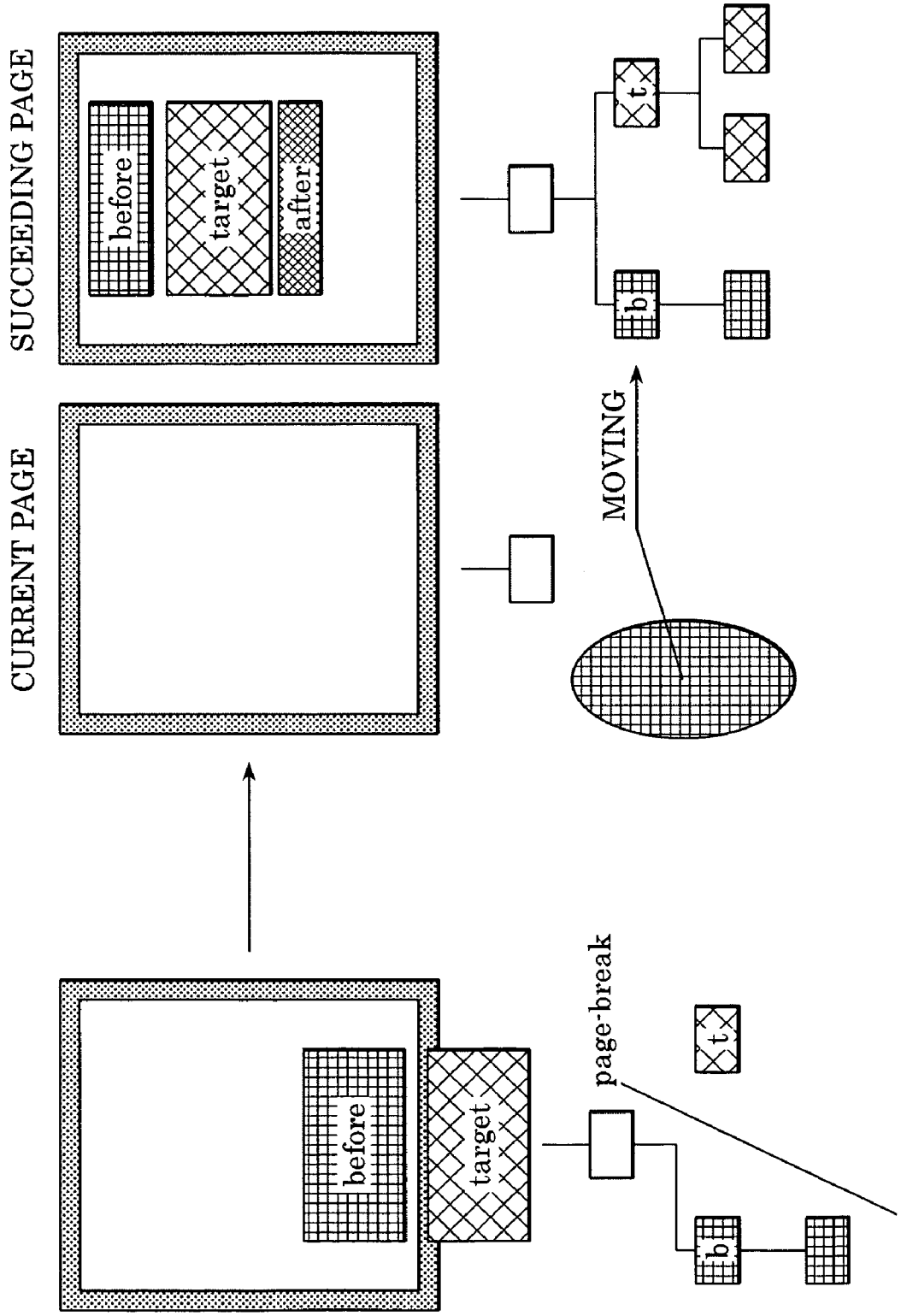
FIG. 7C shows "page-break-before: avoid;" specification.

FIG. 7C shows the page-break-before: avoid specification that is made for performing page-break processing before a specified tag. In that case, sub trees after the next-previous element are moved from the page-tree of the next-previous page to the current page-tree. After that, page-layout processing is performed.

Figure 7D:
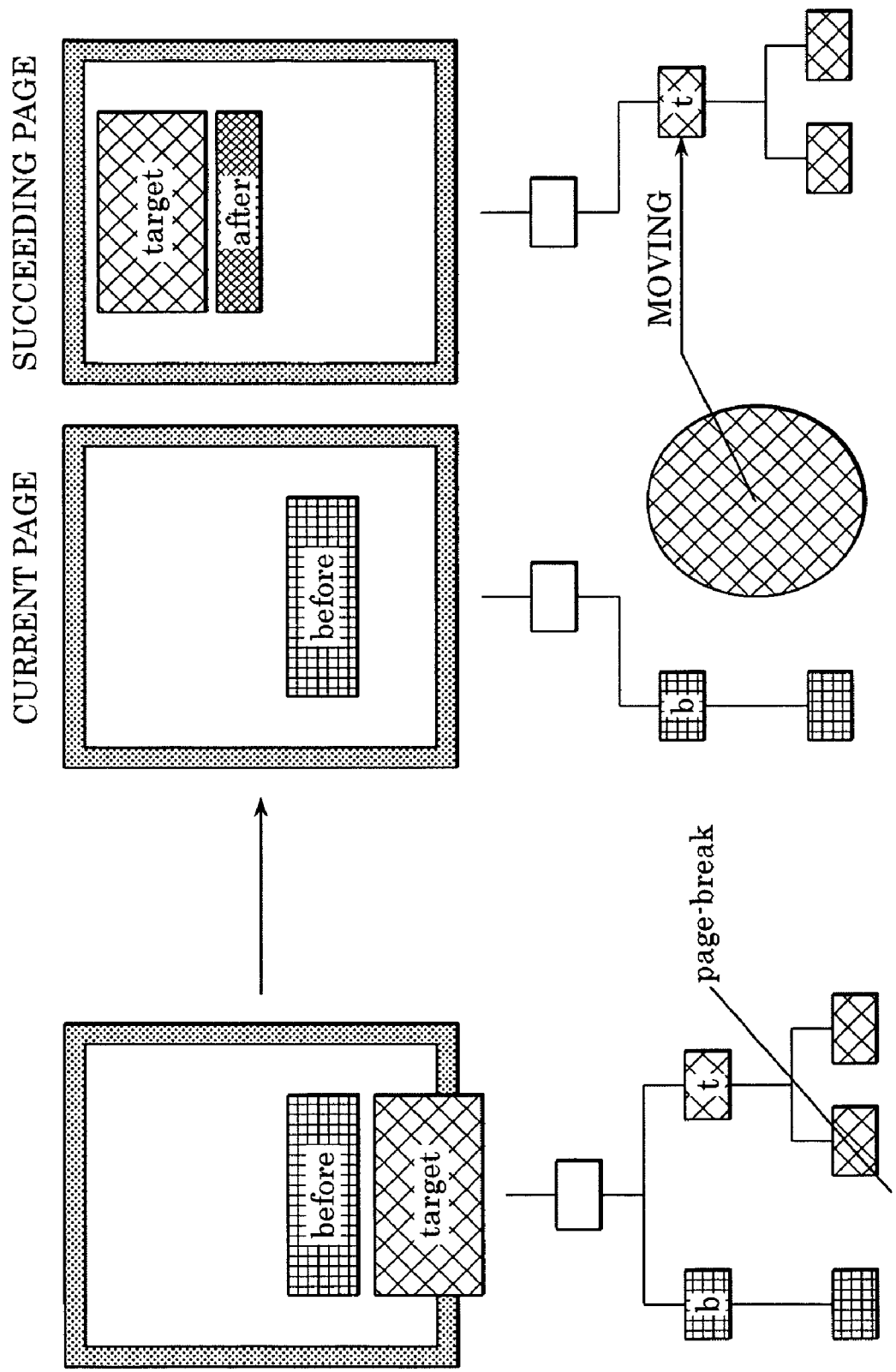
FIG. 7D shows "page-break-inside: avoid;" specification.

FIG. 7D shows the page-break-inside: avoid specification that is made in the case where a specified tag does not fall within a single page. In that case, trees after the current block element are moved to a page-tree of the succeeding page.

Figure 7E:
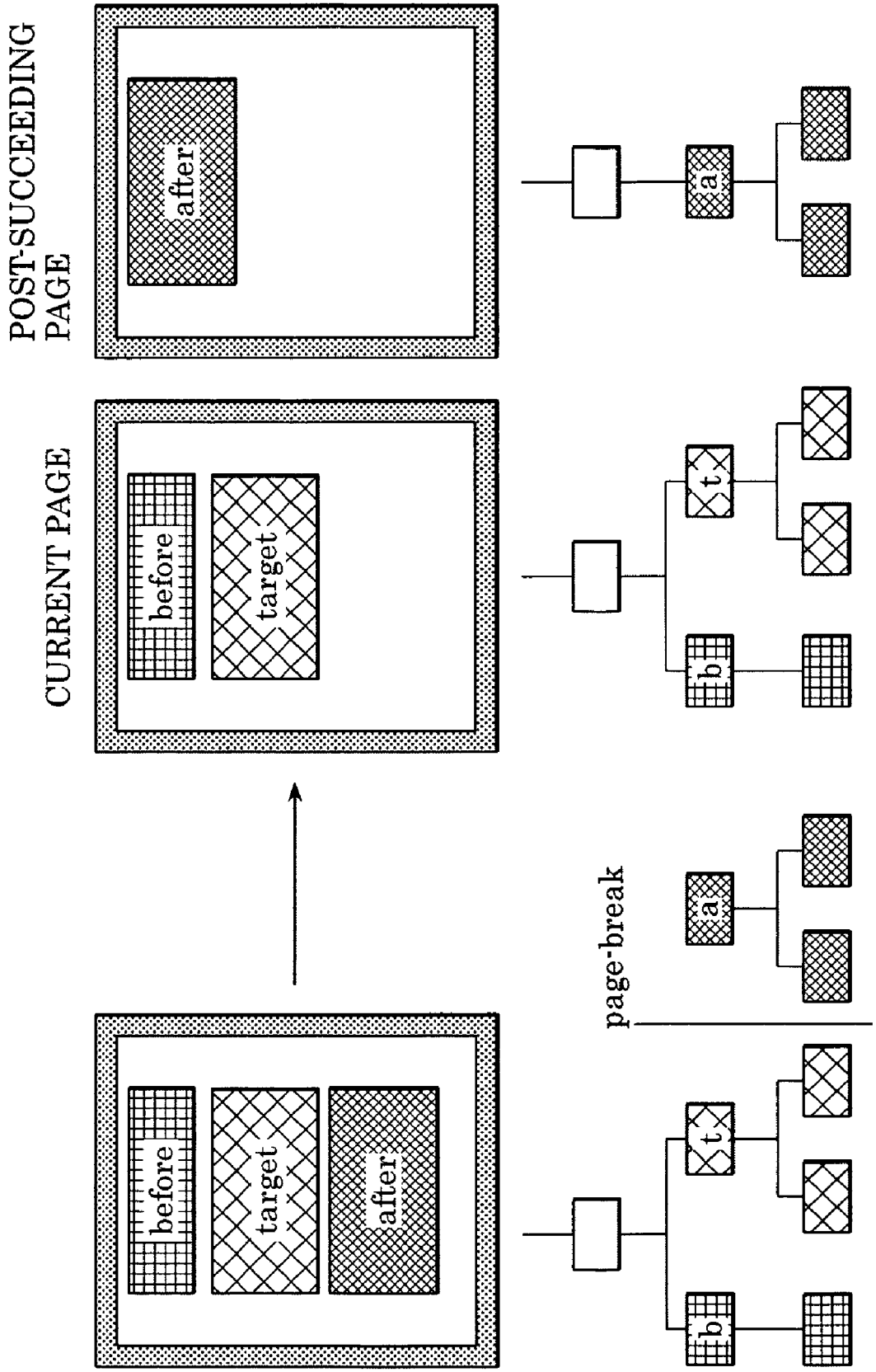
FIG. 7E shows either "page-break-after: always left;" specification, or "page-break-after: always right;" specification.

FIG. 7E shows either the page-break-after: always-left specification or the page-break-after always-right specification that is made for performing forced page-break processing at the end of page-layout processing performed for a specified tag. Each of the page-break-after: left specification and the page-break-after: right specification is made for performing forced page-break processing until the page corresponding to a specified side appears.

Figure 7F:
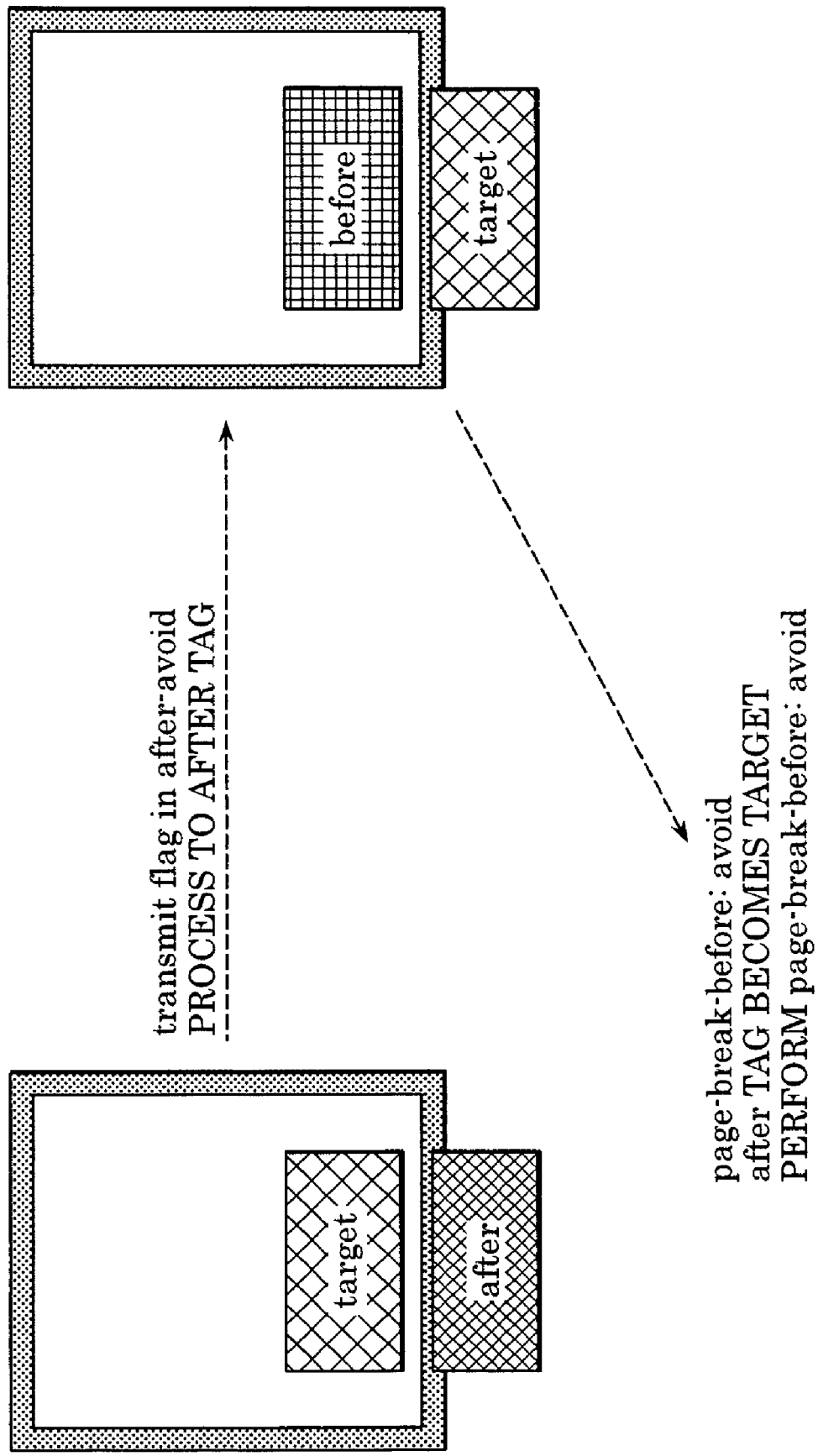
FIG. 7F shows "page-break-after: avoid;" specification.

FIG. 7F shows the page-break-after: avoid specification that is made for transmitting a flag subjected to the after-avoid processing to the next element block. Upon receiving the flag subjected to the after-avoid processing, the next element block performs the same processing as that of the case where the page-break-before: avoid specification is made. Further, where the page-break-before/inside/after specification is made, which does not correspond to any of the above-described examples, page-break processing is not performed.

[Origin Point Control]

FIG. 8 illustrates the position of an origin point during the page-break processing is performed.

The origin point indicating the position where the arrangement is started for each page is set at a position corresponding to the upper left of "Page BOX" determined by information about the size, orientation, and margin of a form, where the information is shown in the above-described page structure. The term "Page BOX" indicates an area into which the substance of the element block is arranged. The "Page BOX" allows making settings for each of pages so that the settings are different from one another. For example, where the position: absolute specification, which indicates an absolute position, is made, as the style specification, tags after <body> are arranged at the origin point of the "Page BOX". Further, where the position: static specification, which indicates a relative position, is made, as the style specification, the start point of the first page is determined to be the origin point. After page-break processing is made, the start point is set to a position continued from the next-previous page, so that the tag arrangement is continued.

[Handling of Element]

Reference to element blocks for performing the page-break processing is described next.

Figure 9:
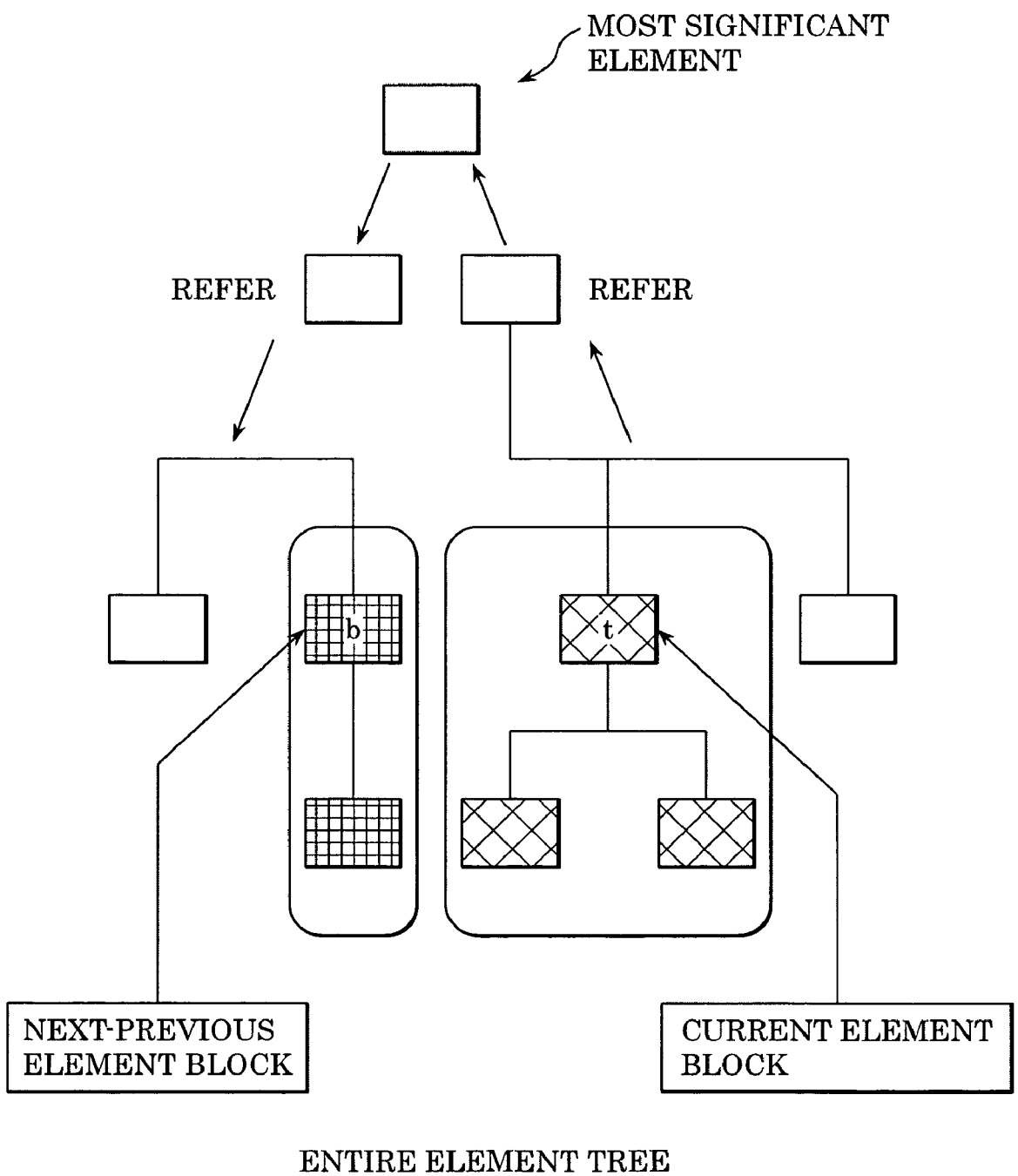
FIG. 9 shows the entire element tree.
Figure 10:
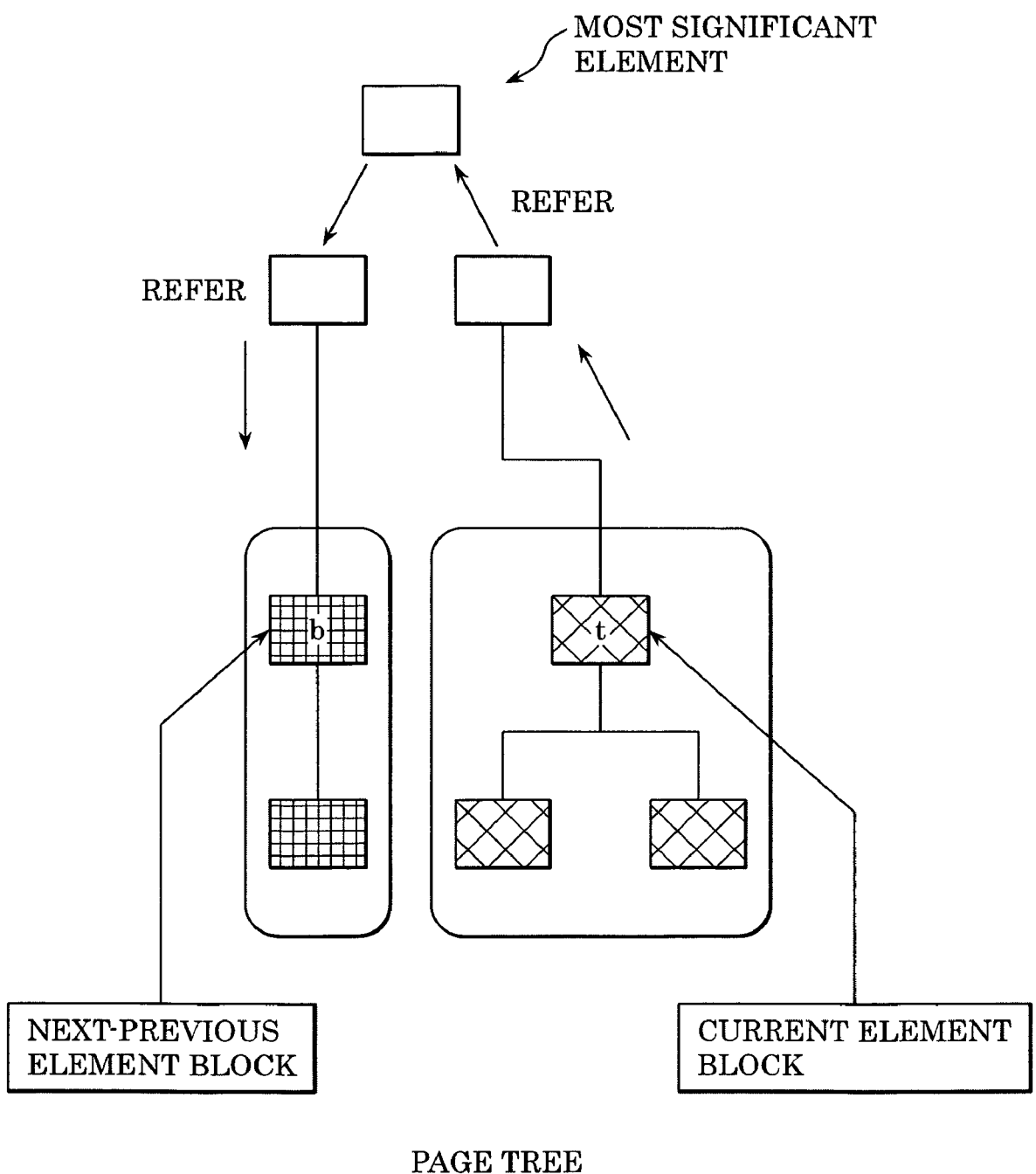
FIG. 10 illustrates a page-tree.

FIG. 9 shows the entire element tree and FIG. 10 shows a page-tree formed by copying data from the entire element tree thereto in sequence.

Where the page-layout processing is performed, the controller 31 refers to the page-tree. Then, every time a new element block appears, the controller 31 renews a reference pointer that identifies an element block that was arranged immediately before, as a "next-previous block", and that identifies an element block that is currently in process, as a "current element block". Then, the controller 31 stores the renewed reference pointer in the RAM. That is, the controller 31 updates the reference pointer every time a new element block appears and manages the element block that is immediately before the current element block and the current element block.

Figure 22:
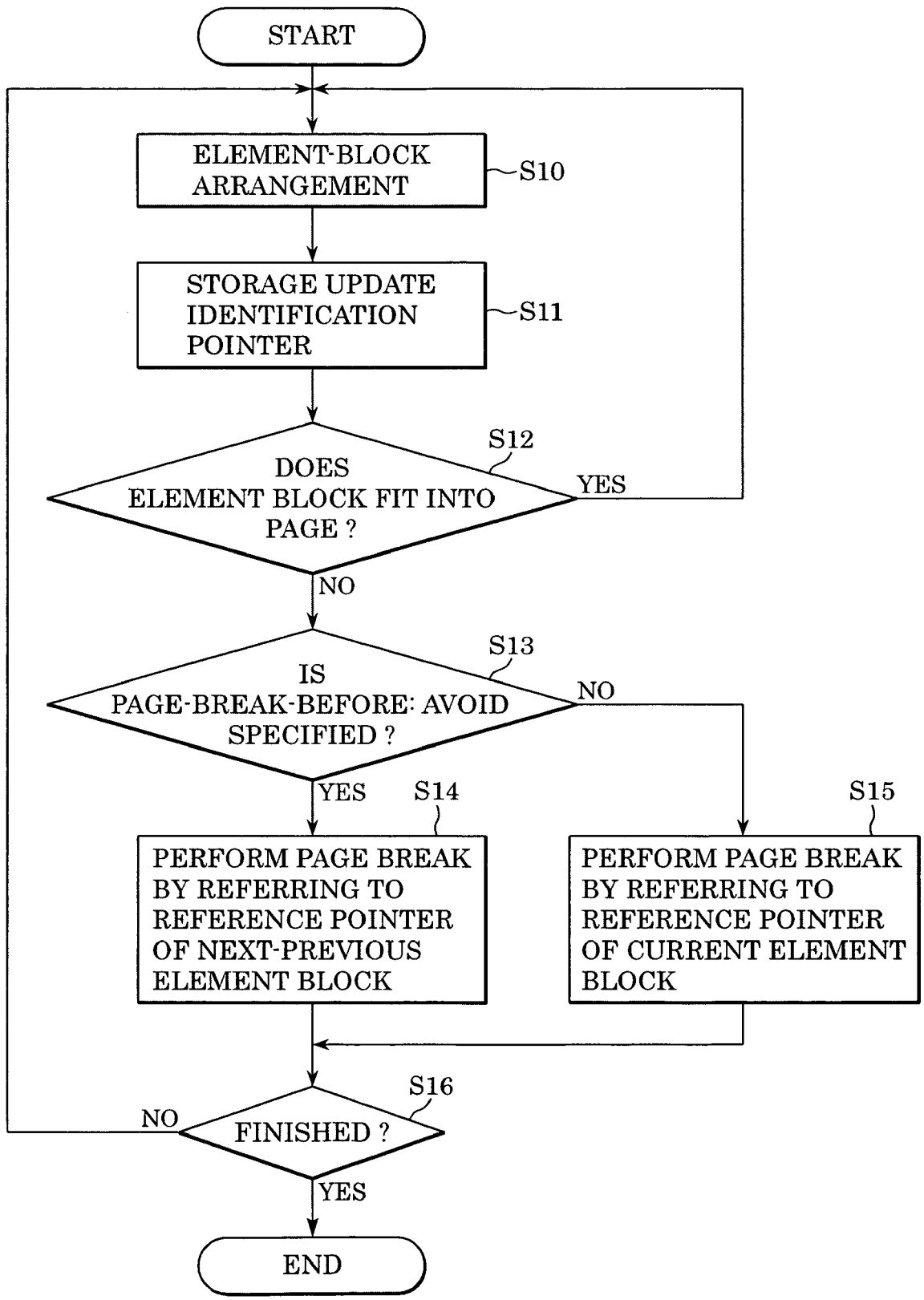
FIG. 22 illustrates processing procedures performed for arranging an element block for performing page-break processing.

FIG. 22 is a flowchart illustrating the page-break processing performed by the controller 31 for arranging an element block.

First, arrangement of the element blocks into the current page is started, at step S10. Then, the controller 31 renews the reference pointer that identifies the most recently arranged element block, as the "next-previous block", and an element block that is to be arranged next, as the "current element block", and stores the renewed reference pointer in the RAM, at step S11.

The controller 31 determines whether or not the current element block that is currently subjected to arrangement falls within the current page, at step S12. If the controller 31 determines that the current element block falls within the current page, the processing returns to step S10, and the controller 31 arranges the next element block.

On the other hand, if the controller 31 determines that the element block does not fall within the current page, the processing advances to step S13. Then, the controller 31 determines whether or not the style structure of the element block includes the page-break-before: avoid specification, at step S13. If it is determined that the style structure includes the above-described specification, the processing advances to step S14. Then, the controller 31 refers to the "next-previous block", moves the sub trees after the "next-previous element block" to the "current page-tree", and performs the page-layout processing, as shown in FIG. 7C.

On the other hand, if it is determined that the style structure does not include the page-break-before: avoid specification, at step S13, the processing advances to step S15. Then, the controller 31 refers to the reference pointer of the "current element block", and performs page-break processing corresponding to the layout specification made for the current element block.

After performing appropriate page break processing (step S14 or step S15), the controller 31 determines whether or not the arrangement of all of the element blocks was finished, at step S16. The controller 31 repeats the above-described processing until the entire arrangement is finished.

In this flowchart, the page-break-before: avoid specification is shown, as an example where the controller 31 refers to the "next-previous element block". However, this flowchart can be used in an example where a specification using the "next-previous element block" is made.

According to the embodiment, the page-break processing is performed according to the type of data including text data and image data, where the data is arranged, as the substance of the element block, as described below. Information about the type of the substance can be obtained by referring to each of the tags in the structured document. The information is stored in the element structure 202.

[Arrangement of Text]

Figure 20:
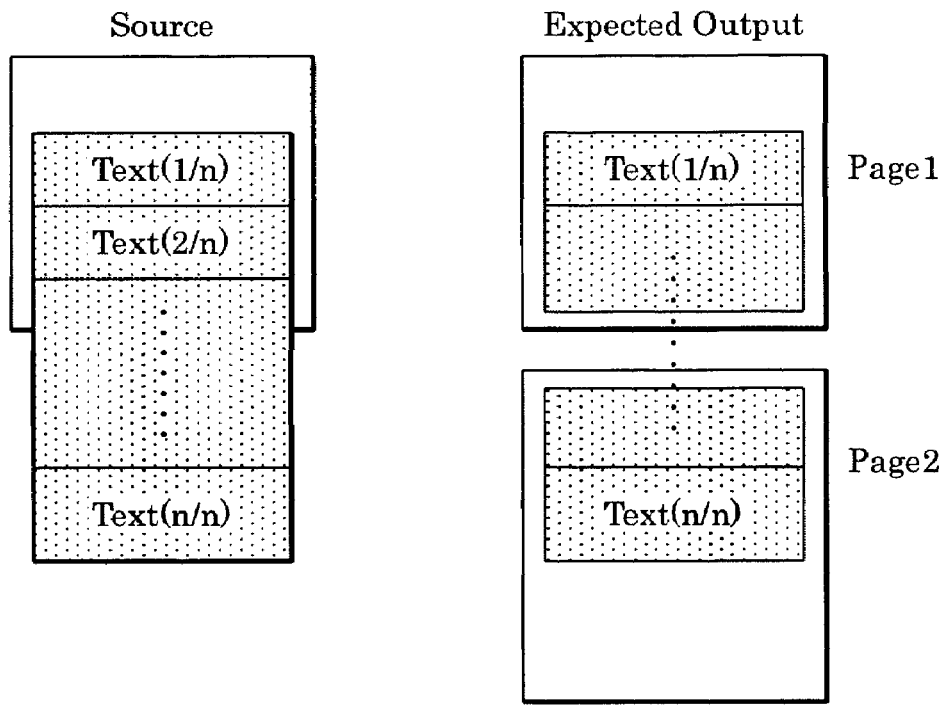
FIG. 20 shows the arrangement of an element block including text data, where the arrangement is performed for achieving page-break processing.

FIG. 20 shows an example where an element block including text data goes beyond the lower end of a page area and where the element block is divided and arranged by determining a line on which the text data in a box is arranged to be a break-point unit. The break-point unit is referred to as a line BOX.

FIG. 11 illustrates the details of the example where the element block including the text data is arranged at the lower end of the page.

The text data in the element block is divided for every line BOX. An identification specifier indicating either arrangement finished or arrangement unfinished is added to each of the line BOX including the divided text data. An element block including text data corresponding to an unfinished line BOX is left in the current page-tree and copied to the next page-tree. At the time of performing page-layout processing for the succeeding page, the controller 31 refers to either the identification specifier indicating that arrangement is finished or the identification specifier indicating that arrangement is unfinished. Subsequently, the controller 31 can start the data arrangement from the unfinished line BOX instead of using the line BOX corresponding to the data that had already been arranged into the next-previous page. That is, the starting point of the unfinished line BOX is set to the head of the Page BOX and the arrangement is continued.

Figure 23:
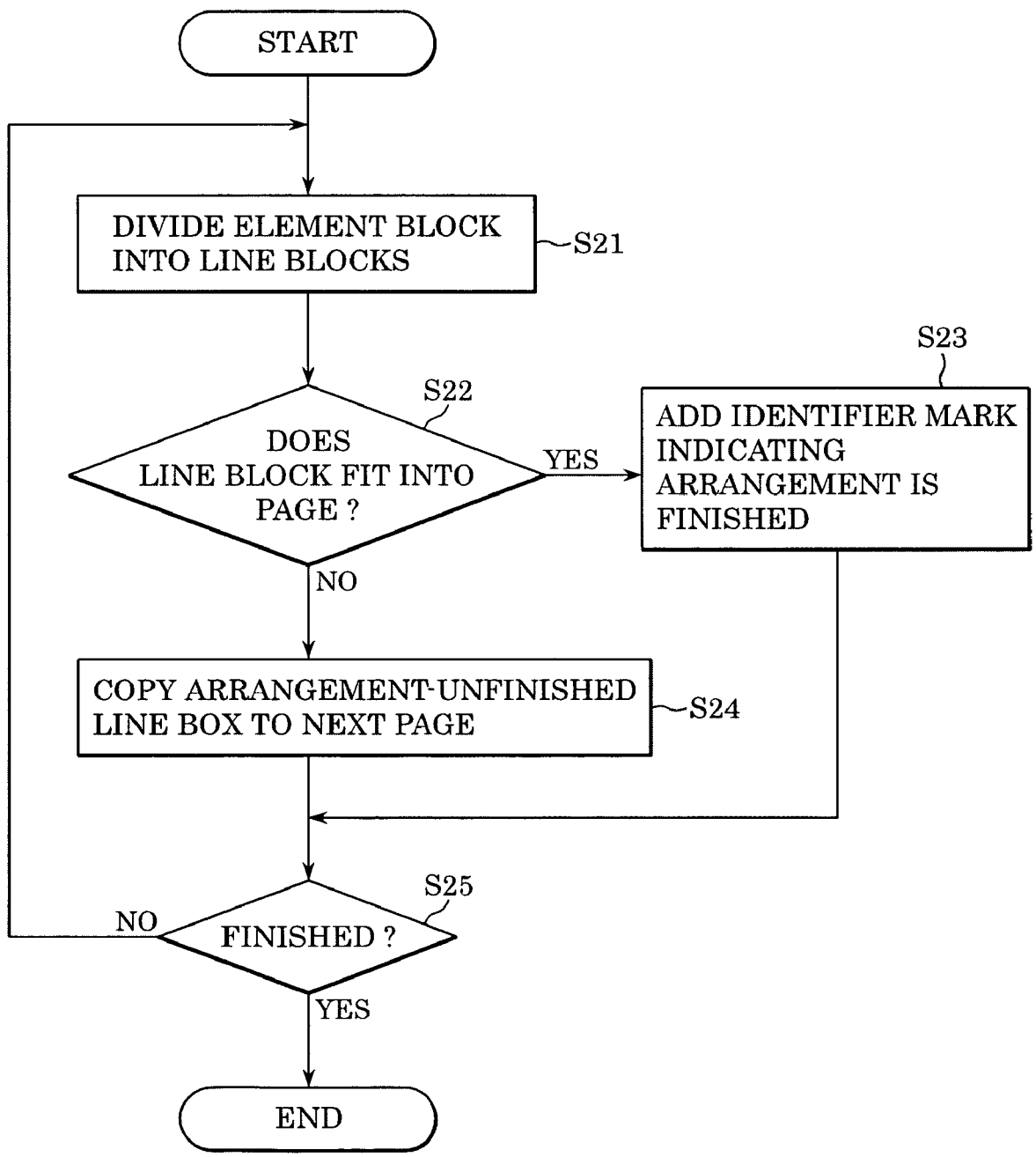
FIG. 23 is a flowchart illustrating processing procedures performed for arranging an element block including text data for performing page-break processing.

FIG. 23 is a flowchart illustrating page-break processing performed by the controller 31 where the text data is arranged as an element block.

The element block that includes the text data, as an object, is divided for every line, at step S21. Each of the divided blocks is referred to as a line BOX. Then, it is determined whether each of the line BOXes falls within a predetermined page (step S22).

If it is determined that the line BOX falls within the page, the line BOX is arranged and an identifier indicating that the arrangement was finished is added to the line BOX (step S23). Processing then proceeds to step S25. On the other hand, where it is determined that the line BOX does not fall within the page, the element block including the text data, as the object, is copied to the page-tree of the succeeding page (step S24). Processing then proceeds to step S25.

In step S25, it is determined whether the arrangement of all of the element blocks was finished. The above-described processing is repeated until the entire arrangement is finished.

[Arrangement of Image Data]

FIG. 12 illustrates an example where page-break processing is performed for an element block including image data according to a known method.

In the past, where the image data of the element block does not fall within a page area, page-break processing is performed only for the image data of the element block without consideration of a style specification that had been set for an element block that is the parent of the concerned element block. The style specification includes background settings of the BOX model, for example.

In that case, the image data is not arranged into the current page. The identification specifier indicating that arrangement is unfinished is added to the image data and subjected to the next page-layout processing, so that the starting point of image arrangement is set to the head of the Page BOX, and the arrangement is continued.

FIG. 13 illustrates an example where an element block including image data is arranged at the lower end of a predetermined page. This drawing shows how the image data and the style specification corresponding thereto should be handled during page-break processing. That is to say, where a background specification is made for the image data and the image data does not fall within the blank area of a predetermined page so that the image data is transmitted to a succeeding page, the background specification is also transmitted to the succeeding page. The above-described method is referred to as a page-assignment method. This allocation of the image data is accomplished by involving layout structure 204 into the element block.

[Arrangement of Image beyond Page Box]

Figure 14:
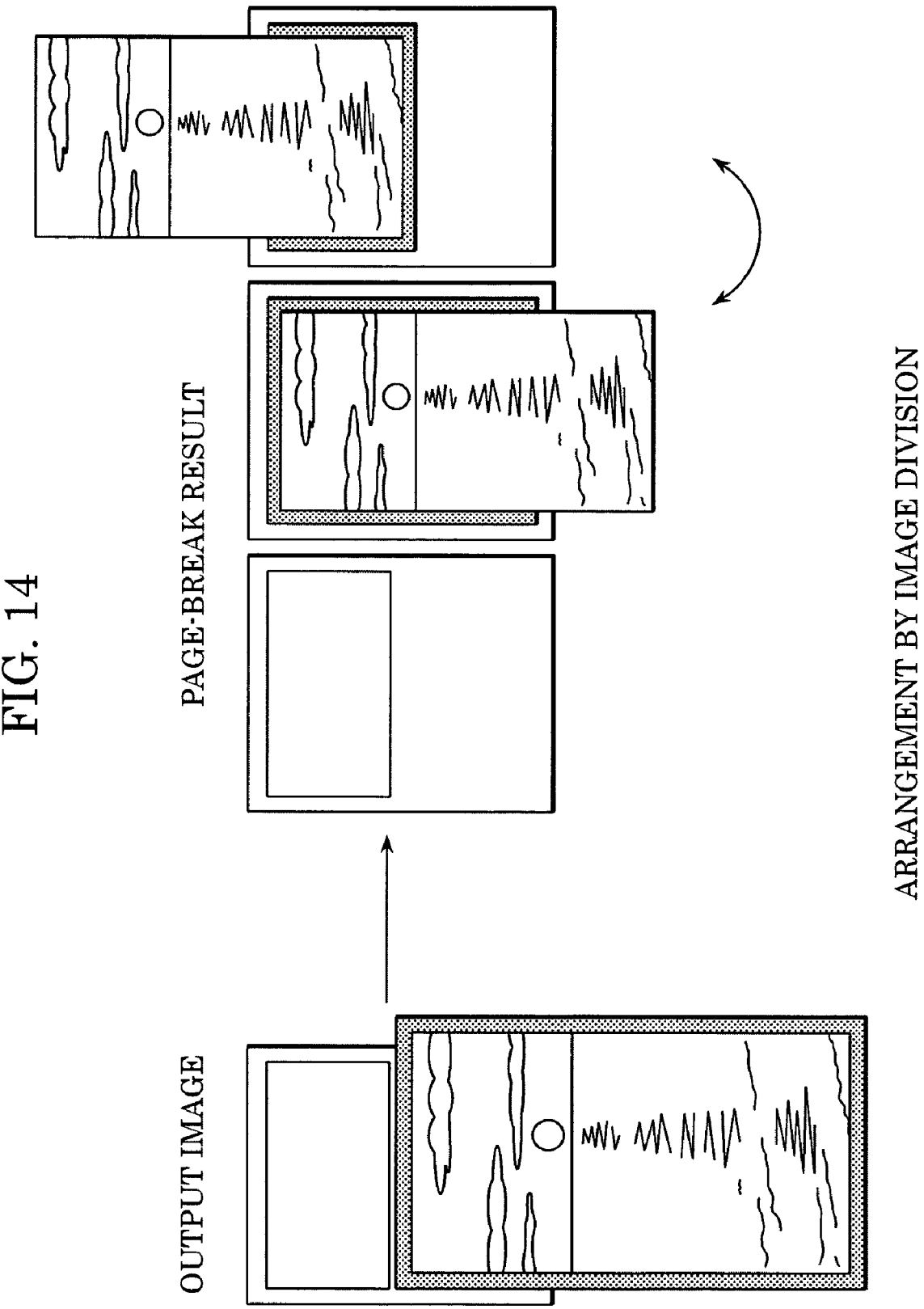
FIG. 14 shows page-break processing performed for the element block including image data according to the embodiment of the present invention, where the page-break processing is achieved by dividing the image data.

FIG. 14 illustrates processing performed in the case where the image data does not fall within the blank area of the page after the page-break processing is performed. That is to say, where the image in the vertical orientation does not fall within the page even after the image is rescaled while maintaining the aspect ratio thereof so that the image in the lateral orientation falls within the blank area of the page, the image is divided into at least two parts in the vertical direction. In this drawing, "page-break-inside: split" specification is proposed, as a new style of the page-layout processing.

More specifically, where it is determined that a target image does not fall within the blank area of the current page, where the "page-break-inside: split" specification was made, the controller 31 performs page-break processing, and reduces the image so that the aspect ratio of the image is maintained until the image in the lateral orientation falls within the blank area of the page. If it is determined that the image in the vertical orientation does not fall within the blank area of the page after the reduction processing is performed, the controller 31 divides the image into at least two parts and arranges the parts into subsequent pages in sequence.

Figure 15:
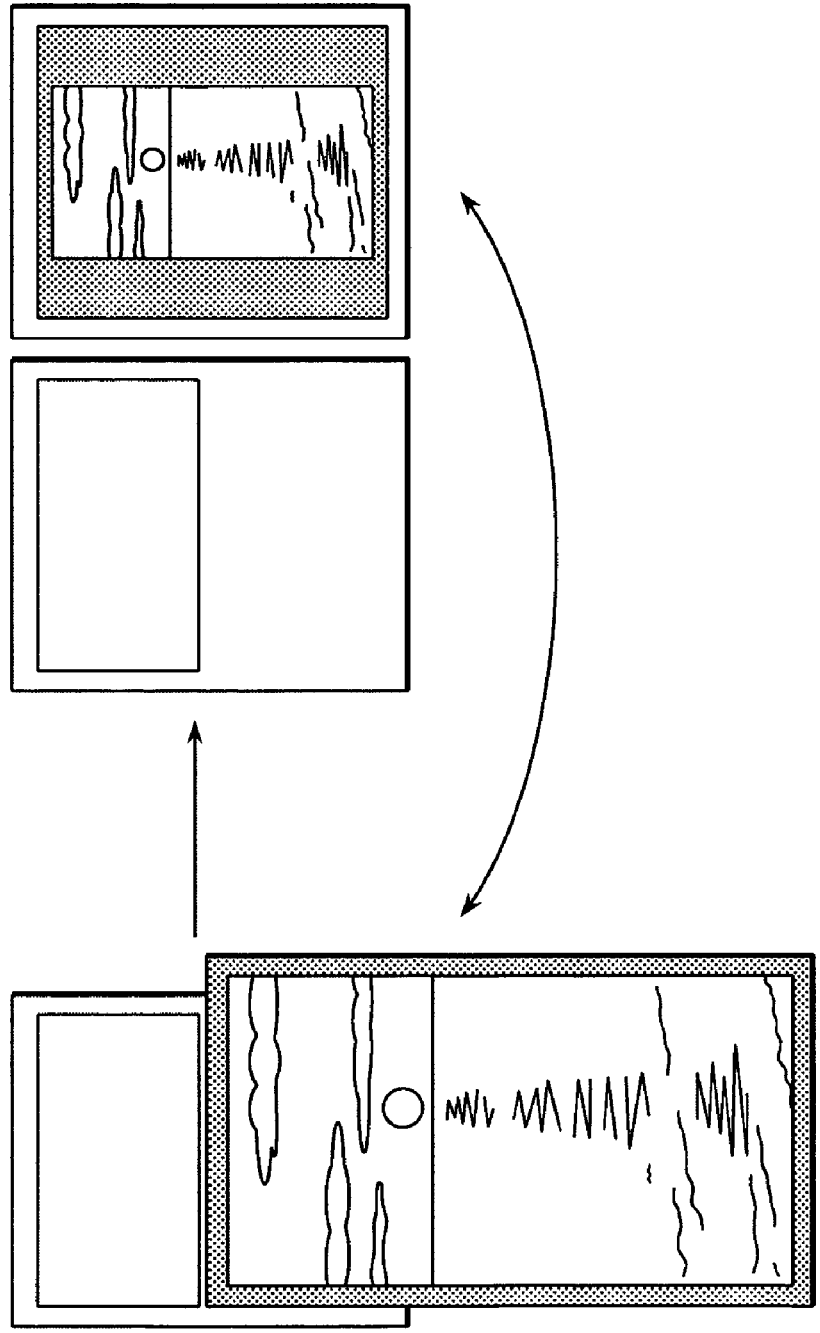
FIG. 15 shows page-break processing performed for the element block including image data according to the embodiment of the present invention, where the page-break processing is achieved by reducing the image data.

FIG. 15 shows page-layout processing according to the embodiment, where the processing is performed in the case where the known "page-brake-inside: avoid" specification is made for an image that extends beyond the Page BOX. More specifically, where it is determined that a target image does not fall within the blank area of the current page in the case where the "page-brake-inside: avoid" specification is made, the controller 31 performs page-break processing. Further, if it is determined that the image does not fall within the blank area of a new page, even though the page-break processing is performed, the controller 31 reduces the image so that the aspect ratio of the image is maintained, instead of dividing the image so that the image falls within the blank area of the new page.

Figure 21:
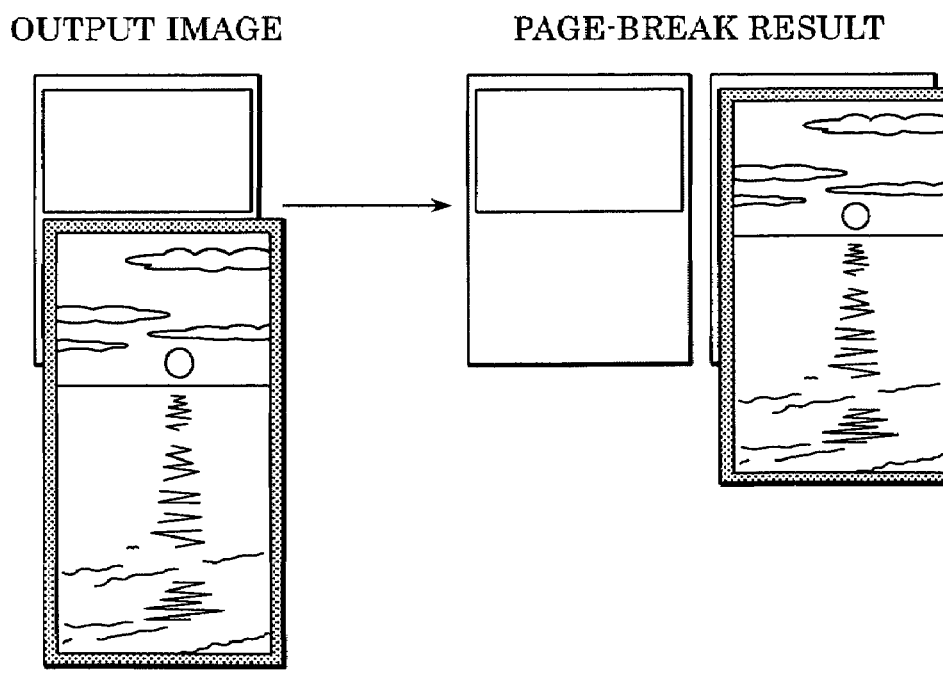
FIG. 21 illustrates the arrangement of an element block including image data, where the arrangement is performed by clipping the image data for achieving page-break processing.

FIG. 21 illustrates other processing suitable for the case where an image does not fall within the blank area of a predetermined page, even though page-break processing is performed. In this drawing, only part of the image falls within the blank area. The image is neither reduced nor divided so that only the part is subjected to print processing.

In this drawing, a "page-break-inside: clip" specification is proposed, as a new style of the page-layout processing. More specifically, where it is determined that a target image does not fall within the blank area of the current page and where the "page-break-inside: clip" specification had been made, the controller 31 performs page-break processing. Subsequently, only part of the target image falls within an image area of the current page, so that only the part is printed and the other part of the image, that is, the part extending beyond the image area is not printed. That is to say, according to the example shown in this drawing, the image is neither reduced nor divided and part of the image is clipped according to the size of the page area into which the clipped image part is arranged. According to the above-described clipping method, the upper-left part of a predetermined image is set to the origin point of an effective area and part of the image, the part extending beyond the effective area, is clipped so that the extending part is eliminated.

Figure 16:
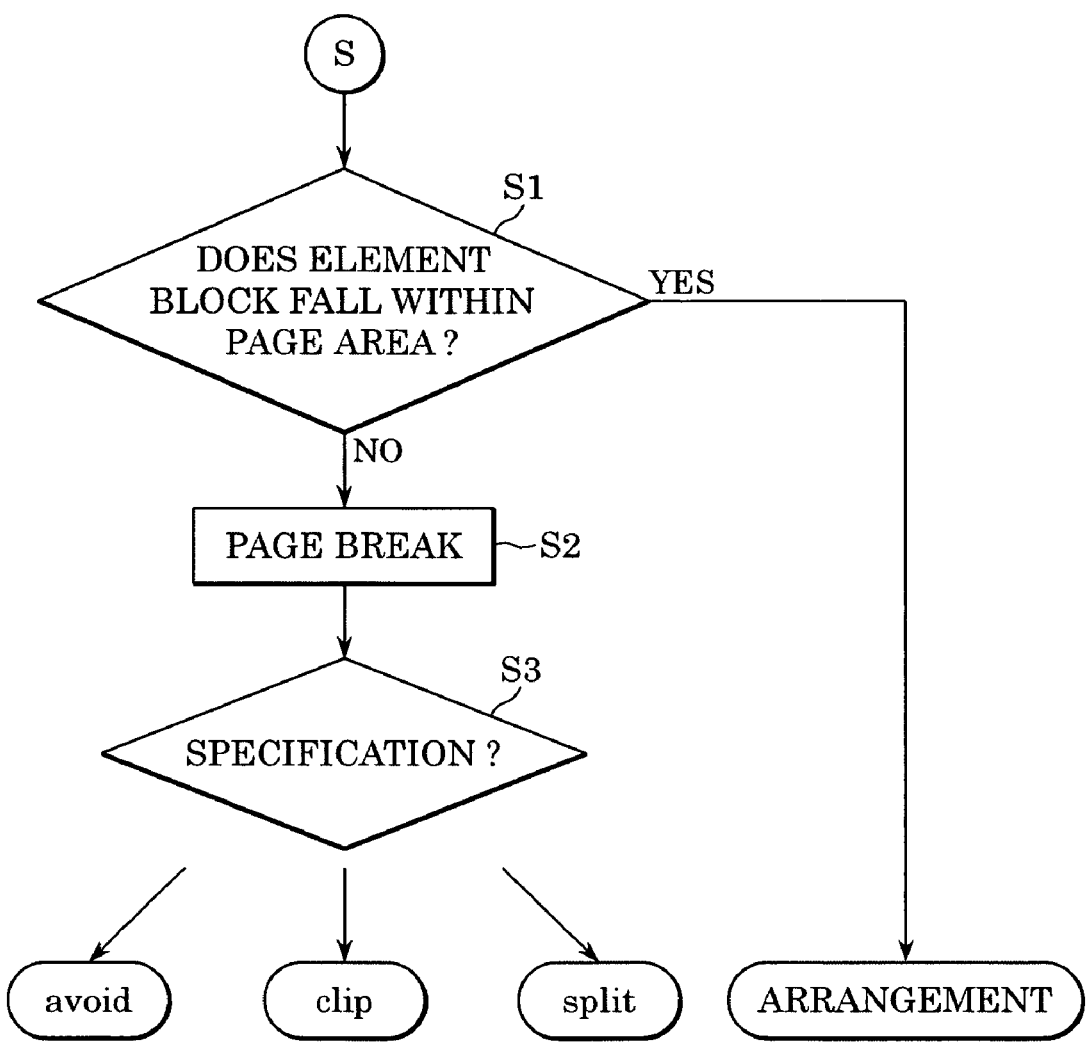
FIG. 16 is a flowchart showing arrangement processing performed for achieving the page-break processing for the element block including the image data.

FIG. 16 is a flowchart illustrating page-break processing performed by the controller 31, where a target element block includes image data.

It is determined whether or not the element block for arrangement falls within a predetermined area of a page, the area into which no element blocks are arranged, at step S1. If it is determined that the element block can be arranged into the area according to the determination result (yes at step S1), the element block is arranged into the area.

Where it is determined that the element block cannot be arranged into the area (no at step S1), the processing advances to step S2, so that page-break processing is performed. Subsequently, a new single page area is generated in a succeeding page.

Then, a page-layout specification is identified, and the processing advances to one of routines "avoid", "clip", and "split", so that the routine corresponds to the identified page-layout specification, at step S3.

Figure 17:
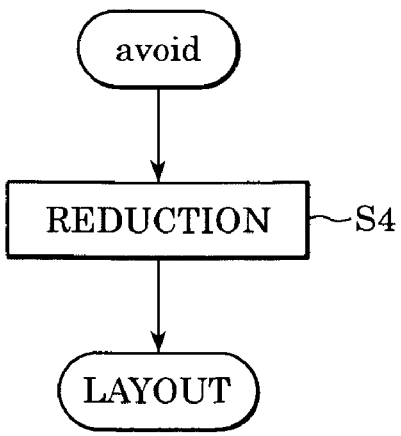
FIG. 17 is a flowchart showing arrangement processing performed for achieving the page-break processing (avoid) for the element block including the image data.

FIG. 17 is a flowchart illustrating page-break processing performed by the controller 31, where the element block includes the image data and where the routine "avoid" is specified. In that case, the element block including the image data is reduced so that the element block falls within a single page, and the element block is arranged, at step S4.

Figure 18:
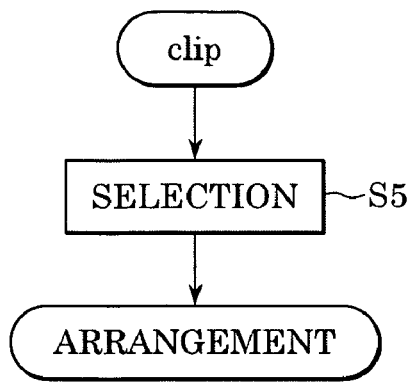
FIG. 18 is a flowchart showing arrangement processing performed for achieving the page-break processing (clip) for the element block including the image data.

FIG. 18 is a flowchart illustrating page-break processing performed by the controller 31, where the element block includes the image data and where the routine "clip" is specified. In that case, the element block including the image data is arranged, as it is, at step S5. However, part of the image, that is, the part extending beyond the current page is not printed.

Figure 19:
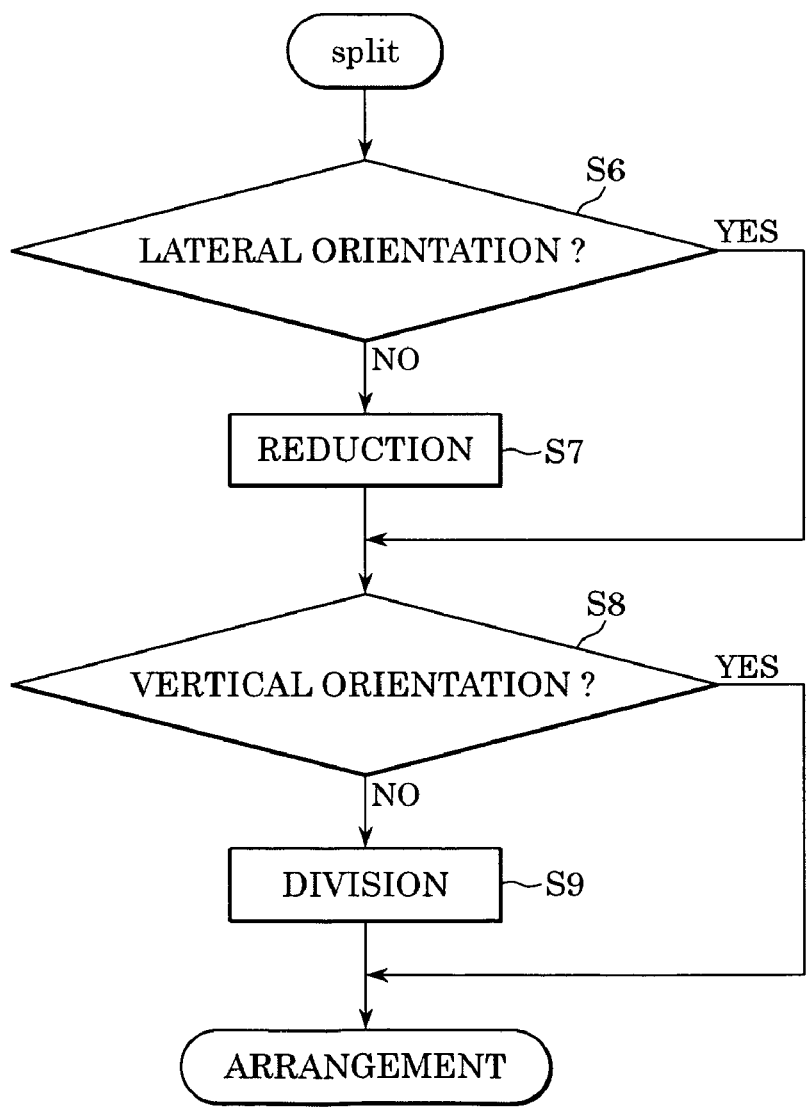
FIG. 19 is a flowchart showing arrangement processing performed for achieving the page-break processing (split) for the element block including the image data.

FIG. 19 is a flowchart illustrating page-break processing performed by the controller 31, where the element block includes the image data and where the routine "split" is specified.

First, it is determined whether or not the image falls within the page area in the lateral orientation, at step S6. If it is determined that the image falls within the page area (yes at step S6), the processing advances to step S8. If it is determined that the image cannot be arranged into the page area according to the determination result (no at step S6), the processing advances to step S7.

At step S7, the image is reduced so that the image can be arranged into the page area in the lateral orientation.

Next, it is determined whether or not the image can be arranged into the page area in the vertical orientation, at step S8. If the image can be arranged (yes at step S8), the image is arranged into the page area, as it is. Otherwise (no at step S8), the image is divided into at least two parts and page-break processing is performed (step S9). Then, arrangement of the parts is continued.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2004-163561 filed Jun. 1, 2004 and 2005-141183 filed May 13, 2005, which are hereby incorporated by reference herein.

What is claimed is:

1. An image-forming device for selecting at least one element block from an element tree obtained by analyzing a structured document and arranging the selected element block into a predetermined page, the image-forming device comprising:

an arrangement unit configured to arrange a first element block into the page;

an update unit configured to update a first reference pointer that refers to the first element block, as a next-previous element block, after the first element block is arranged by the arrangement unit and a second reference pointer that refers to a second element block that is arranged after the first element block is arranged, as a current element block;

a style-reference unit configured to refer to a style specification corresponding to the second element block; and a determination unit configured to determine which of the first updated reference pointer and the second updated reference pointer is suitable for use based on the style specification referred to by the style-reference unit, wherein the arrangement unit is configured to arrange the first element block by referring to either the first reference pointer or the second reference pointer determined by the determination unit.

2. The image-forming device according to claim 1, wherein the style specification is equivalent to a page-break-processing specification.

3. A processing method for an image-forming device for selecting at least one element block from an element tree obtained by analyzing a structured document and arranging the selected element block into a predetermined page, the processing method comprising steps of:

arranging a first element block into the page;

updating a first reference pointer that refers to the first element block, as a next-previous element block, after the first element block is arranged and a second reference pointer that refers to a second element block that is arranged after the first element block is arranged, as a current element block;

referring to a style specification corresponding to the second element block; and determining which of the first updated reference pointer and the second updated reference pointer is suitable for use based on the style specification corresponding to the second element block, wherein, the first element block is arranged into the page by referring to either the first reference pointer or the second reference pointer that is determined based on the style specification corresponding to the second element block.

4. The processing method according to claim 3, wherein the style-specification is equivalent to a page-break-processing specification.

5. A computer-readable medium having stored thereon a program product for making an image-forming device execute the processing method according to claim 3.

6. An image-forming device for selecting at least one element block from an element tree obtained by analyzing a structured document and arranging the selected element block into a predetermined page, the image-forming device comprising:
- a size-determination unit configured to determine whether at least one element block for arrangement falls within the predetermined page; and
- a page-break-processing unit configured to perform page-break processing corresponding to a type of data of the element block for arrangement, where the size-determination unit determines that the element block for arrangement does not fall within the predetermined page,
- wherein the page-break-processing unit is configured to move the element block for arrangement to the head of a succeeding page, where contents of the element block for arrangement is image data, and
- wherein, where the element block for arrangement has specification of a background, the page-break-processing unit is configured to move the background to the head of the succeeding page.

7. An image-forming device for selecting at least one element block from an element tree obtained by analyzing a structured document and arranging the selected element block into a predetermined page, the image-forming device comprising:
- a size-determination unit configured to determine whether at least one element block for arrangement falls within the predetermined page; and
- a page-break-processing unit configured to perform page-break processing corresponding to a type of data of the element block for arrangement, where the size-determination unit determines that the element block for arrangement does not fall within the predetermined page,
- wherein the page-break-processing unit is configured to move the element block for arrangement to the head of a succeeding page, where contents of the element block for arrangement is image data, and
- wherein, where the element block for arrangement does not fall within the succeeding page, the page-break-processing unit is configured to reduce the image data.

8. A processing method for an image-forming device for selecting at least one element block from an element tree obtained by analyzing a structured document and arranging the selected element block into a predetermined page, the processing method comprising steps of:
- determining whether at least one element block for arrangement falls within the predetermined page; and
- performing page-break processing corresponding to a type of data of the element block for arrangement, where it is determined that the element block for arrangement does not fall within the predetermined page,
- wherein, where contents of the element block for arrangement is image data, performing page-break processing includes moving the element block for arrangement to the head of a succeeding page, and
- wherein, where the element block for arrangement has specification of a background, performing page-break processing includes moving the background to the head of the succeeding page.

9. A processing method for an image-forming device for selecting at least one element block from an element tree obtained by analyzing a structured document and arranging the selected element block into a predetermined page, the processing method comprising steps of:
- determining whether at least one element block for arrangement falls within the predetermined page; and
- performing page-break processing corresponding to a type of data of the element block for arrangement, where it is determined that the element block for arrangement does not fall within the predetermined page,
- wherein, where contents of the element block for arrangement is image data, performing page-break processing includes moving the element block for arrangement to the head of a succeeding page, and
- wherein, where the element block for arrangement does not fall within the succeeding page, performing page-break processing includes reducing the image data.

10. A computer-readable medium having stored thereon a program product for making an image-forming device execute the processing method according to claim 8.

11. A computer-readable medium having stored thereon a program product for making an image-forming device execute the processing method according to claim 9.

* * * * *